US012719645B2

(12) United States Patent
Takizawa et al.

(10) Patent No.: US 12,719,645 B2
(45) Date of Patent: Aug. 25, 2026

(54) TRANSMISSION CONTROL METHOD AND INFORMATION PROCESSING APPARATUS

(71) Applicant: TOYOTA JIDOSHA KABUSHIKI KAISHA, Toyota (JP)

(72) Inventors: Kenichi Takizawa, Koganei (JP); Masafumi Moriyama, Koganei (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 656 days.

(21) Appl. No.: 17/936,586

(22) Filed: Sep. 29, 2022

(65) Prior Publication Data

US 2023/0093810 A1 Mar. 30, 2023

(30) Foreign Application Priority Data

Sep. 30, 2021 (JP) ................................ 2021-162106

(51) Int. Cl.
*H04L 5/00* (2006.01)
*H04W 72/044* (2023.01)

(52) U.S. Cl.
CPC ............ *H04L 5/006* (2013.01); *H04L 5/0048* (2013.01); *H04W 72/0473* (2013.01)

(58) Field of Classification Search
CPC .. H04L 5/006; H04L 5/0048; H04W 72/0473; H04W 52/146; H04W 52/242;
(Continued)

(56) References Cited

U.S. PATENT DOCUMENTS 10,117,120 B2 * 10/2018 Sun ......................... H04L 5/006
10,548,096 B2 * 1/2020 Papasakellariou .. H04W 52/367
(Continued)

FOREIGN PATENT DOCUMENTS

JP 2018-032887 A 3/2018
JP 2019-009790 A 1/2019
(Continued)

OTHER PUBLICATIONS

Masafumi Moriyama et al., "Experimental Evaluation of a Novel Up-Link NOMA System for IoT Communication Equipping Repetition Transmission and Receive Diversity", IEICE Trans. Commun., vol. E102-B, No. 8, Aug. 2019, pp. 1467-1476.
(Continued)

*Primary Examiner* — Edan Orgad

(74) *Attorney, Agent, or Firm* — Finnegan, Henderson, Farabow, Garrett, and Dunner, LLP

(57) ABSTRACT

Provided is a transmission control method for transmitting stations which are connected to a wireless communication partner receiving station by non-orthogonal multiple access, and each of which is capable of transmitting a same signal successively to the receiving station by repetition for a predetermined number of times at a predetermined cycle which is common to the transmitting stations. In this method, an information processing apparatus calculates an initial value of transmitting power to be assigned to each of the transmitting stations, so that the better a reception quality at the receiving station the higher the initial value, and that a power difference required between transmitting stations can be ensured, and calculates a number of times of repetition of a first transmitting station, to which the maximum initial value of the transmitting power is assigned, out of transmitting stations, based on an index value of the reception quality.

18 Claims, 16 Drawing Sheets

(58) Field of Classification Search
CPC ... H04W 52/367; H04W 52/346; Y02D 30/70
See application file for complete search history.

(56) References Cited

U.S. PATENT DOCUMENTS

| | | | | |
|---|---|---|---|---|
| 10,645,730 | B2 * | 5/2020 | Cao | H04W 76/27 |
| 11,483,810 | B2 * | 10/2022 | Zhang | H04W 74/006 |
| 11,601,957 | B2 * | 3/2023 | Zeng | H04W 72/23 |
| 11,889,541 | B2 * | 1/2024 | Balasubramanian | H04W 72/541 |
| 11,924,845 | B2 * | 3/2024 | Li | H04B 7/18539 |
| 11,974,291 | B2 * | 4/2024 | Liu | H04L 1/189 |
| 12,362,787 | B2 * | 7/2025 | Wu | H04W 52/54 |
| 2007/0091983 | A1 * | 4/2007 | Siriwongpairat | H04B 1/71632 375/130 |
| 2016/0352454 | A1 * | 12/2016 | Zhang | H04L 1/0009 |
| 2017/0208552 | A1 * | 7/2017 | Ohwatari | H04W 52/243 |
| 2017/0366999 | A1 | 12/2017 | Tsuboi et al. | |
| 2018/0026743 | A1 * | 1/2018 | Zhang | H04J 99/00 370/329 |
| 2018/0048348 | A1 * | 2/2018 | Gau | H04L 5/0016 |
| 2018/0070274 | A1 * | 3/2018 | Ode | H04W 8/005 |
| 2018/0160372 | A1 * | 6/2018 | Benjebbour | H04W 72/23 |
| 2018/0249358 | A1 * | 8/2018 | Ratasuk | H04W 72/121 |
| 2018/0295651 | A1 * | 10/2018 | Cao | H04W 72/23 |
| 2019/0029031 | A1 * | 1/2019 | Kumar | H04W 72/21 |
| 2019/0052309 | A1 * | 2/2019 | Schmidt | H04W 72/23 |
| 2019/0312694 | A1 * | 10/2019 | Jia | H04L 1/003 |
| 2019/0334686 | A1 * | 10/2019 | Li | H04L 5/0053 |
| 2019/0363846 | A1 * | 11/2019 | Lei | H04W 72/23 |
| 2020/0029283 | A1 * | 1/2020 | Lei | H04W 24/08 |
| 2020/0186189 | A1 * | 6/2020 | Herath | H04B 1/707 |
| 2020/0260499 | A1 * | 8/2020 | Sarkis | H04L 5/10 |
| 2020/0321999 | A1 * | 10/2020 | Gau | H04J 13/102 |
| 2020/0358638 | A1 * | 11/2020 | Lin | H04L 25/0204 |
| 2020/0399582 | A1 * | 12/2020 | Jose | C12M 41/00 |
| 2021/0067300 | A1 * | 3/2021 | Pan | H04W 24/10 |
| 2021/0144037 | A1 * | 5/2021 | Yamamoto | H04J 99/00 |
| 2021/0242968 | A1 * | 8/2021 | Kim | H04L 25/03866 |
| 2021/0274515 | A1 * | 9/2021 | Lei | H04W 72/0446 |
| 2021/0360610 | A1 | 11/2021 | Kim et al. | |
| 2022/0174687 | A1 * | 6/2022 | Kuo | H04W 72/23 |
| 2024/0284494 | A1 | 8/2024 | Kim et al. | |
| 2025/0133584 | A1 | 4/2025 | Kim et al. | |

FOREIGN PATENT DOCUMENTS

| | | | |
|---|---|---|---|
| WO | WO 2016/185530 | A1 | 11/2016 |
| WO | WO 2020/096330 | A1 | 5/2020 |

OTHER PUBLICATIONS

3GPP TR 38.830, V17.0.0, Study on NR Coverage Enhancements (Release 17), Dec. 2020.

Amini, Mohammad Reza et al., “Random-Access NOMA in URLL Energy-Harvesting IoT Networks With Short Packet and Diversity Transmissions” IEEE Access, IEEE, USA, vol. 8, Dec. 4, 2020 (Dec. 4, 2020), pp. 220734-220754, XP011826349, DOI: 10.1109/ACCESS.2020.3042744.

* cited by examiner

FIG. 1A

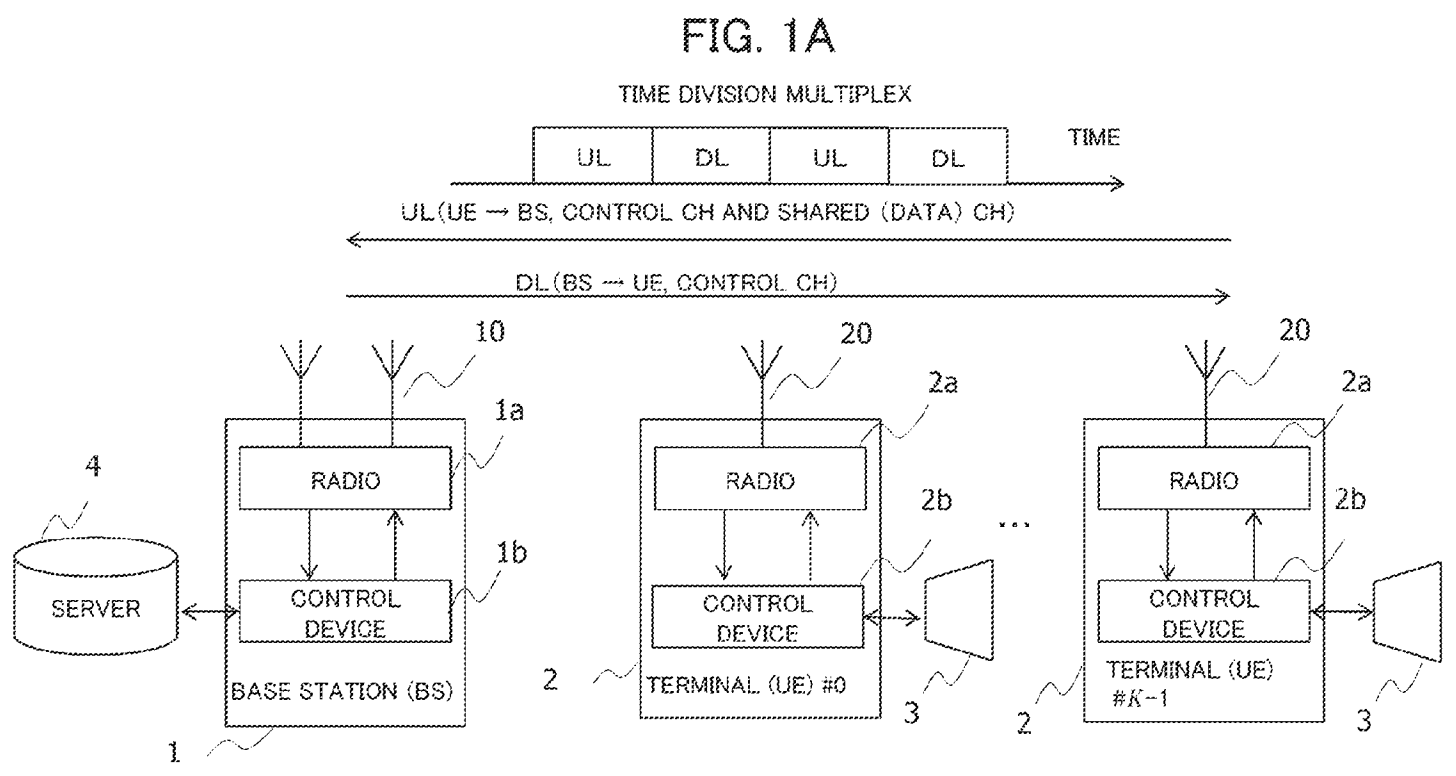

TIME DIVISION MULTIPLEX

UL | DL | UL | DL

TIME

UL (UE → BS, CONTROL CH AND SHARED (DATA) CH)

DL (BS → UE, CONTROL CH)

4 SERVER

1 BASE STATION (BS)

10

1a RADIO

1b CONTROL DEVICE

2 TERMINAL (UE) #0

20

2a RADIO

2b CONTROL DEVICE

3

...

2 TERMINAL (UE) #K-1

20

2a RADIO

2b CONTROL DEVICE

Figure 1B:
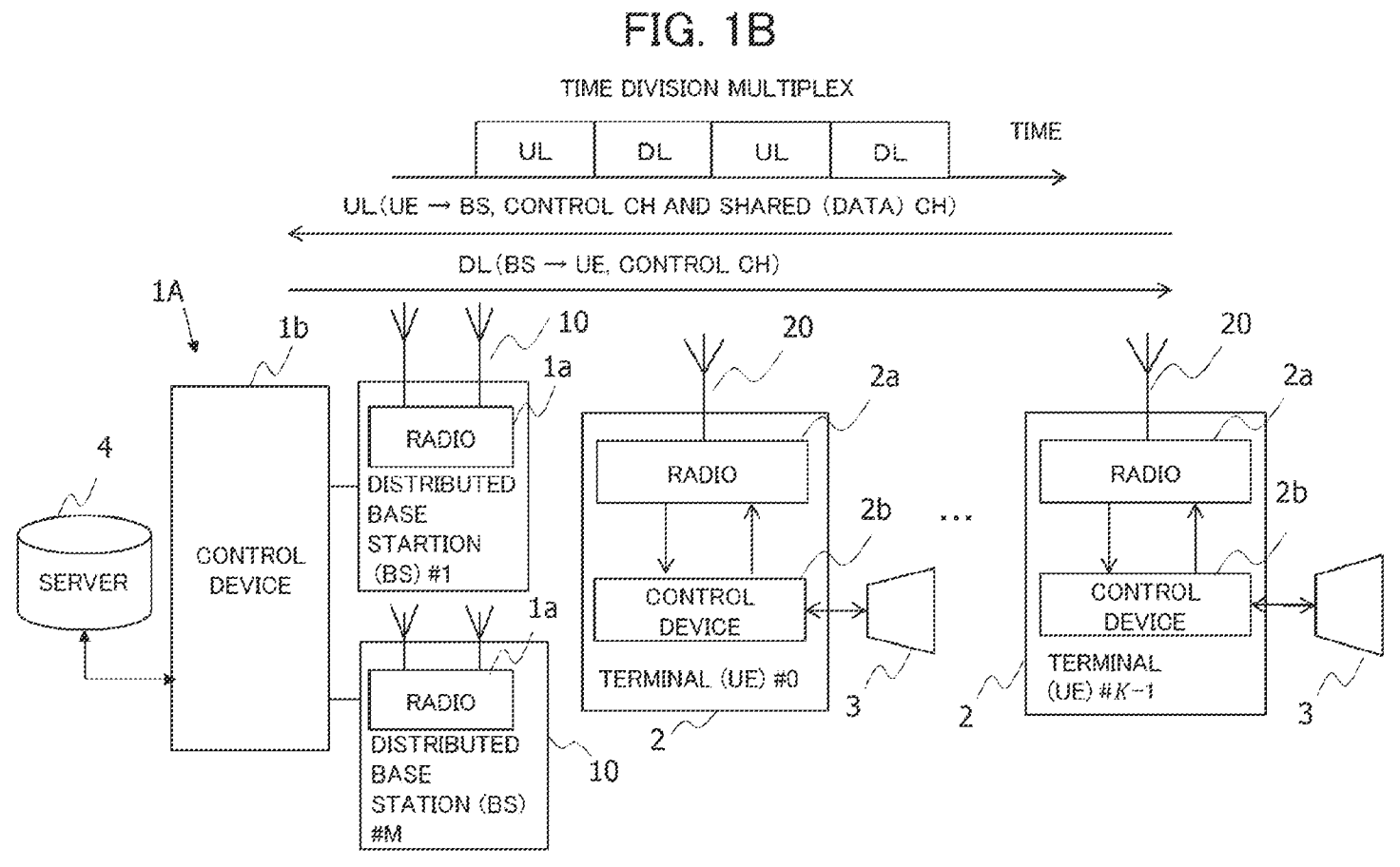

TIME DIVISION MULTIPLEX
UL
DL
UL
DL
TIME
UL (UE → BS, CONTROL CH AND SHARED (DATA) CH)
DL (BS → UE, CONTROL CH)
1A
4
SERVER
1b
CONTROL DEVICE
10
1a
RADIO
DISTRIBUTED BASE STARTION (BS) #1
10
1a
RADIO
DISTRIBUTED BASE STATION (BS) #M
20
2a
RADIO
2b
CONTROL DEVICE
TERMINAL (UE) #0
2
3
...
20
2a
RADIO
2b
CONTROL DEVICE
TERMINAL (UE) #K-1
2
3

FIG. 2

RADIO FRAME

SUBFRAME

DL UL UL UL UL DL UL UL UL UL

SLOT

Reference Signal

Data Signal

FIG. 3

RECEIVING POWER
D1
D2
A
B
C
FREQUENCY
DECODE AND REMOVE SIGNAL A
B
C
FREQUENCY
DECODE AND REMOVE SIGNAL B
C
FREQUENCY

FIG. 4

RECEIVING POWER AT BS

SLOT t 1 2 3 4 5

1b
CONTROLLER
11
12
PROCESSOR
STORAGE DEVICE
13
INTERNAL INTERFACE
14
NETWORK INTERFACE
1
1a
RADIO（WIRELESS PROCESSING DEVICE）
10(10-M)
10(10-1)
BS
2b
CONTROLLER
21
22
PROCESSOR
STORAGE DEVICE
23
INTERNAL INTERFACE
24
NETWORK INTERFACE
2
2a
RADIO（WIRELESS PROCESSING DEVICE）
20
UE

FIG. 14

RECEIVING POWER AT BS t 1 2 3 4 5 6

STOP

REDUCITON OF NUMBER OF TIMES OF REPETITION

TRANSMISSION CONTROL METHOD AND INFORMATION PROCESSING APPARATUS

CROSS REFERENCE TO THE RELATED APPLICATION

This application claims the benefit of Japanese Patent Application No. 2021-162106, filed on Sep. 30, 2021, which is hereby incorporated by reference herein in its entirety.

BACKGROUND

1. Technical Field

The present disclosure relates to a transmission control method and an information processing apparatus.

2. Description of the Related Art

The Third Generation Partnership Project (3GPP), a standardization organization that standardizes mobile communications, has set the coverage enhancement (the expansion of a communication range) as a subject in Release 17. In conference discussions, a technique to implement communications that satisfy desired communication requirements, regardless the distance from the base station, was considered, to include cases where the propagation loss between the base station and the terminal is large.

A prior art related to the present disclosure is a technique to improve the signal to noise ratio (SNR) at a receiving station by repeatedly transmitting a same signal, and integrating the same signals at the receiving station (e.g. 3GPP TR 88.880, Study on NR coverage enhancements (Release 17), December 2020). Another prior art is a technique that allows a plurality of terminals, which can perform non-orthogonal multiple access (NOMA) to the base station, to transmit data in a same time zone using a same frequency band (e.g. M. Moriyama, T. Takizawa, M. Oodo, H. Tezuka, and F. Kojima, "Experimental Evaluation of a Novel Uplink NOMA System for IoT communication Equipping Repetition Transmission and Receive Diversity," IEICE Trans. Commun., Vol. E102-B, No. 8, pp. 1467-1476).

SUMMARY

It is an object of the present disclosure to provide a technique that allows a plurality of transmitting stations, which are connected to a receiving station by non-orthogonal multiple access, to perform good repetition transmission.

An aspect of the present disclosure is a transmission control method for a plurality of transmitting stations which are connected to a wireless communication partner receiving station by non-orthogonal multiple access, and each of which is capable of transmitting a same signal successively to the receiving station by repetition for a predetermined number of times at a predetermined cycle, which is common to the plurality of transmitting stations. In this transmission control method, an information processing apparatus executes steps of: calculating an initial value of transmitting power to be assigned to each of the plurality of transmitting stations so that the better a reception quality at the receiving station the higher that initial value, and that a receiving power difference required between transmitting stations can be ensured; and calculating a number of times of the repetition of a first transmitting station, to which the maximum initial value of the transmitting power assigned, out of the plurality of the transmitting stations, based on an index value of the reception quality.

Another aspect of the present disclosure is an information processing apparatus including a controller. In this information processing apparatus, for a plurality of transmitting stations which are connected to a wireless communication partner receiving station by non-orthogonal multiple access, and each of which is capable of transmitting a same signal successively to the receiving station by repetition for a predetermined number of times at a predetermined cycle which is common to the plurality of transmitting stations, the controller executes steps of: calculating an initial value of transmitting power to be assigned to each of the plurality of transmitting stations so that the better a reception quality at the receiving station the higher the initial value, and that a receiving power difference required between transmitting stations can be ensured; and calculating a number of times of the repetition of a first transmitting station, to which the maximum initial value of the transmitting power is assigned, out of the plurality of the transmitting stations, based on an index value of the reception quality.

Another aspect of the present disclosure is a transmission control method performed in a first transmitting station included in a plurality of transmitting stations which are connected to a wireless communication partner receiving station by non-orthogonal multiple access, and each of which is capable of transmitting a same signal successively to the receiving station by repetition for a predetermined number of times at a predetermined cycle which is common to the plurality of transmitting stations. In this transmission control method, the first transmitting station executes steps of: receiving information including a number of times of repetition to the receiving station and transmitting power used for each time of the repetition; and performing the repetition based on the information. In a case where the transmitting power includes a first value, which is an initial value of transmitting power assigned to the first transmitting station, and the first value is not a maximum value of the initial values of the transmitting power assigned to the plurality of transmitting stations, the information is transmitting power that is used after the repetition from the transmitting station to which the maximum value is assigned stops, and includes a second value which is larger than the first value.

Another aspect of the present disclosure is a first transmitting station included in a plurality of transmitting stations which are connected to a wireless communication partner receiving station by non-orthogonal multiple access, and each of which is capable of transmitting a same signal successively to the receiving station by repetition for a predetermined number of times at a predetermined cycle, which is common to the plurality of transmitting stations. The first transmitting station includes: a communication unit that receives information including a number of times of repetition to the receiving station and transmitting power used for each time of the repetition; and a controller that controls the repetition based on the information using the communication unit. In a case where the transmitting power includes a first value, which is an initial value of transmitting power assigned to the first transmitting station, and the first value is not a maximum value of the initial values of the transmitting power assigned to the plurality of transmitting stations, the information is the transmitting power that is used for repetition after the repetition from the transmitting station to which the maximum value is assigned stops, and includes a second value which is larger than the first value.

Other aspects of the present disclosure may include a wireless communication system which includes the above mentioned plurality of transmitting stations and receiving station, a program which causes a computer to operate as the above mentioned transmitting stations, receiving station or information processing apparatus, and a non-transitory storage medium which records the above mentioned program.

According to the present disclosure, a plurality of transmitting stations, which are connected to a receiving station by non-orthogonal multiple access, can perform good repetition transmission.

BRIEF DESCRIPTION OF THE DRAWINGS

FIG. 1A is a diagram depicting a first configuration example of a wireless communication system, and FIG. 1B is a diagram depicting a second configuration example of the wireless communication system;

FIG. 2 is a diagram depicting an example of a wireless frame that is applied to the wireless communication system;

FIG. 3 is an explanatory diagram of power multiplexing, and interference suppression and cancellation techniques;

FIG. 4 is a diagram depicting an example of repetition in the wireless communication system;

FIG. 14 is a diagram depicting an example of a modified repetition executed in the wireless communication system.

DESCRIPTION OF THE EMBODIMENTS

Configuration of Wireless Communication System

Figure 5:
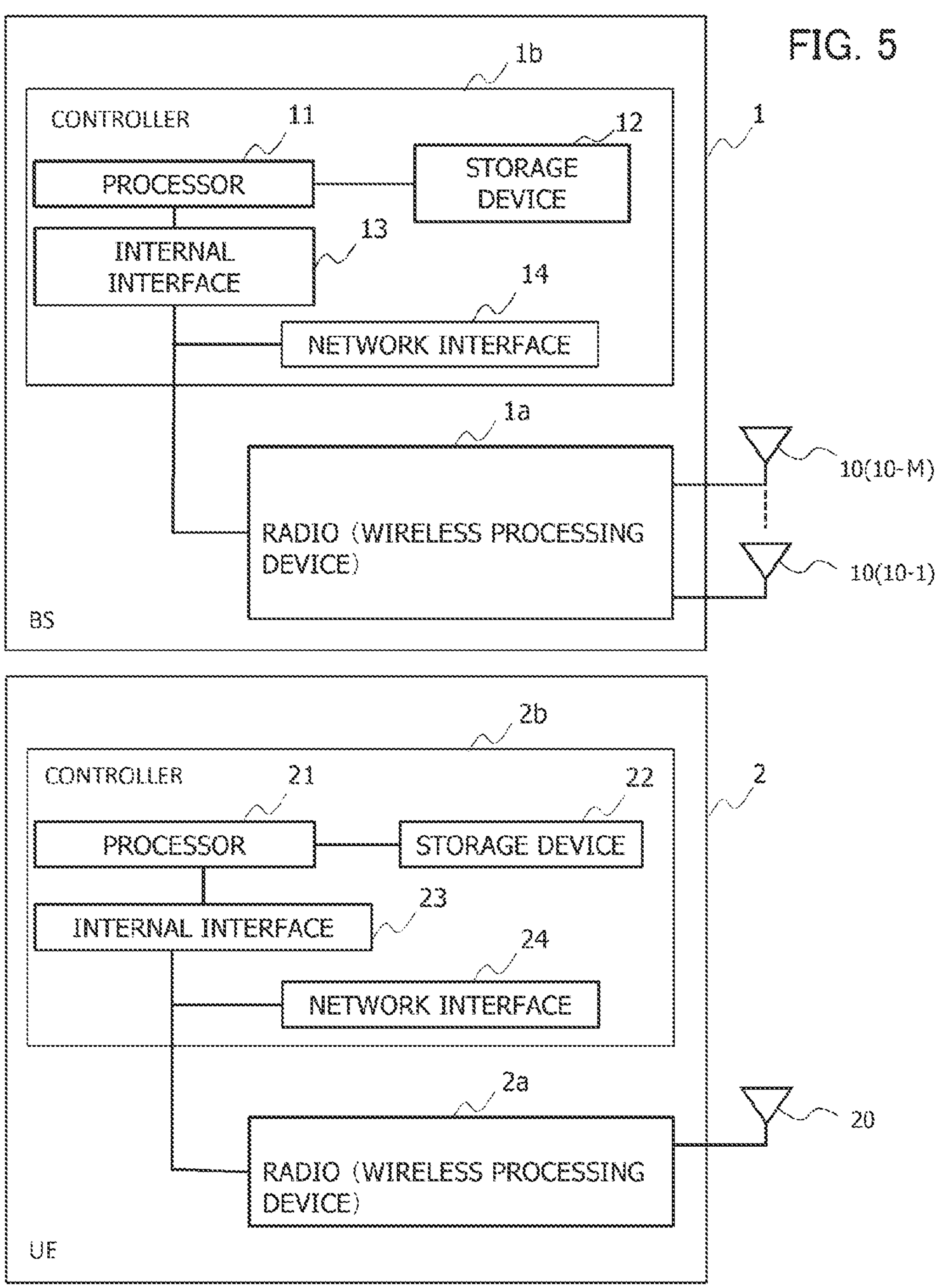
FIG. 5 is a diagram depicting hardware configuration example of a base station and a terminal.

FIG. 1A is a diagram depicting a first configuration example of a wireless communication system according to an embodiment. FIG. 1B is a diagram depicting a second configuration example of the wireless communication system. The wireless communication system according to the first configuration example includes a base station (BS) 1 and a plurality of terminals 2 (#0 to #K−1, K is a natural number that includes 0), which communicate with she base station 1 wirelessly. The base station 1 is an example of a receiving station, and the plurality of terminals 2 are an example of a plurality of transmitting stations.

Each of the plurality of terminals 2 is called a "user equipment (UE)". Each of the plurality of terminals 2 includes an antenna 20, a radio 2*a* connected with the antenna 20, and a control device 2*b* connected with the radio 2*a*. The control device 2*b* acquires (receives) data from a sensor 3 or the like. The control device 2*b* controls the radio 2*a* to transmit data signals or control signals to the base station 1, or to receive control signals and the like from the base station 1. The radio 2*a* converts transmission target signals, including the data signals and control signals, into radio signals, and emits (transmits) the radio signals from the antenna 20. The wireless station 2*a* also converts the radio signals received from she antenna 20 into signal format, which can be handled by the control device 2*b*. A number of antennas 20 may be one or two or more. The terminal 2 may have two or more antennas, so that multiple-input and multiple-output (MIMO) communication is performed with the base station 1.

The base station 1 includes one or two or more antennas 10, a radio 1*a* connected with the antenna 10, and a control device 1*b* connected with the radio 1*a*. The radio 1*a* and the control device 1*b* have the same functions as the radio 2*a* and the control device 2*b*. The control device 2*b* can transmit data received from the terminal 2 to a server 4 or the like. The control device 1*b* is an example of an information processing apparatus (computer). The information processing apparatus may be included in the base station 1, or may be a terminal device (e.g. server) that is different from (independent from) the base station 1. In other words, such a terminal device as a server may have a function to calculate a number of times of the repetition transmission to the plurality of terminals 2 and the transmitting power that is used for each time, and to transmit the calculation result to each terminal 2.

According to the wireless communication system, data acquired by each of the plurality of terminals u from the sensor 3 (e.g. Internet of Things (IoT) data) can be stored on the server 4 via the base station 1. Further, the data from the server 4 can be transmitted to each of the terminals 2 via the base station 1. The terminal 2 may be a fixed terminal or a mobile terminal. The mobile terminal may be a portable terminal or an onboard terminal. The onboard terminal may be a terminal used inside a vehicle, or a terminal installed in the vehicle.

As the second configuration example in FIG. 1B indicates, a base station 1A, which includes at least two distributed base stations (BSs) and a control device 1*b*, may be used instead of the base station 1. A distributed base station includes the antenna 10 and the radio 1*a*, and is called a "remote radio head (RRH)" (radio unit). The control device 1*b*, to which at least two distributed base stations are connected, is called a "base band unit (BBU)" (signal processing unit). In the following, the base station 1 having the first configuration example will be described.

In the first and second configuration examples, the base station 1 and each of the plurality of terminals 2 perform communication (transmission/reception of signals) using a downlink (DL) and an uplink (UL). DL is a line from the base station 1 to the terminal 2, and includes a control channel (control CH) that is used for transmission (notification) of the control signals. UL, on the other hand, is a line from the terminal 2 to the base station 1, and includes the control CH and a shared channel (shared CH) that is used for transmission of data (user data). The shared CH is also called a "data channel".

Wireless Frame

Figure 2:
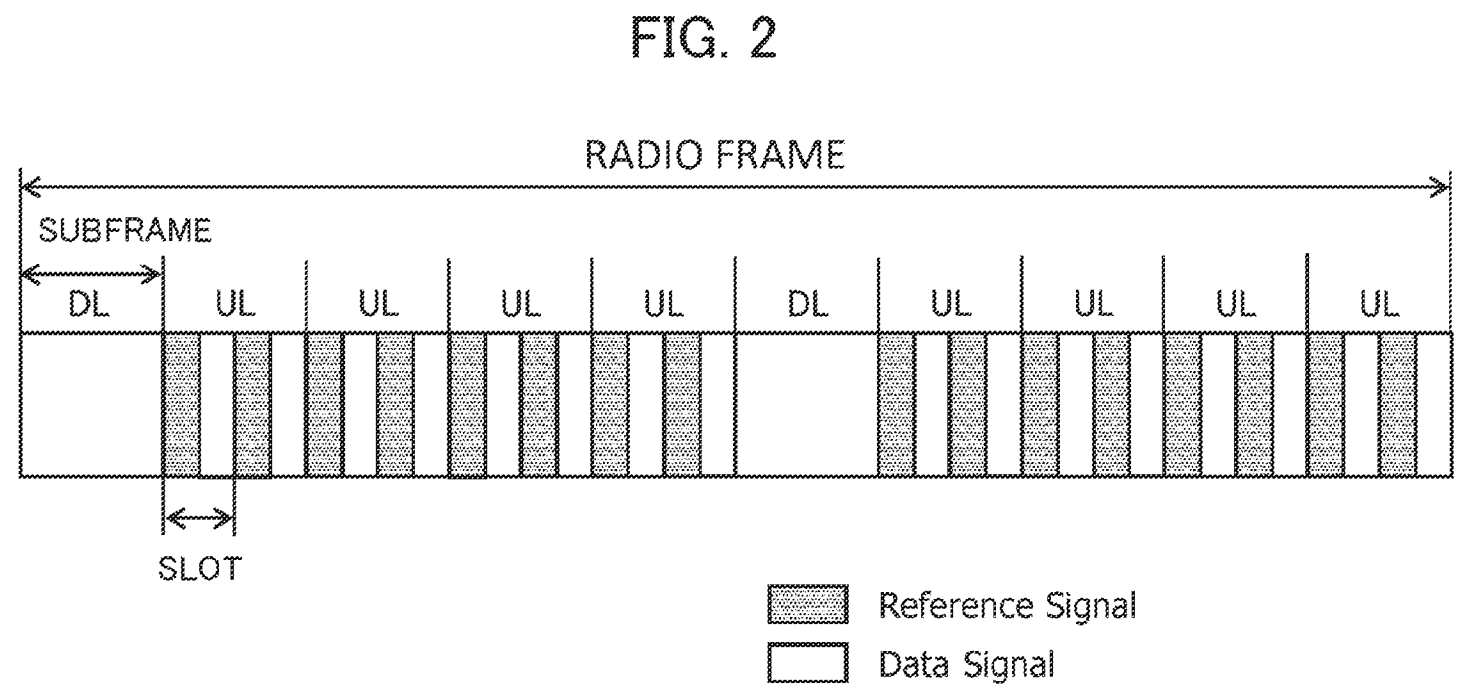

UL signals and DL signals are transmitted using a time domain assigned by the time division multiplexing. FIG. 2 is a diagram depicting an example of a radio (wireless)

frame that is applied to the wireless communication system. In FIG. 2, the wireless frame has a predetermined duration. The wireless frame length is 10 ms in 5G, but may be shorter or longer than 10 ms. The wireless frame is divided into a plurality of sub-frames. In 5G, the sub-frame length is specified to 1 ms, and one wireless frame is divided into 10 sub frames. The sub-frame length and the number of divisions, however, are not. Limited to the example in 5G. One sub-frame may be further divided into two or more slots (slot length: 500 μm). As indicated in FIG. 2, each sub-frame of the wireless frame is assigned to DL or UL. In the example in FIG. 2, DL and UL are assigned such that four ULs continue after one DL, This assignment, however, is changeable. A slot in a sub-frame assigned to a UL is equally divided, where a reference signal (RS) is mapped to the first half portion, and a data signal (DS) is mapped to the latter half portion. However, the arrangement of the reference signal and the data signal in one slot is changeable as necessary.

The reference signal is a known signal in the receiving station (base station 1), and is used to estimate a channel (called a "propagation path" or a "communication channel") of a wireless signal. The data signal is a signal generated by modulating and encoding the user data in accordance with a predetermined modulation and coding scheme (MCS).

Features of Wireless Communication System

The wireless communication system has the following features in the uplink communication of data signals. The first feature is that in the wireless communication system according to the present embodiment, a configured grant (CG) is used. As indicated in FIG. 2, in the UL communication, the frequency channels and slots that can be used for a CG are notified to the terminal 2 in advance, a different reference signal is provided for each terminal 2, and a CG is implemented by transmitting the reference signal along with the data signal (payload). By using a CG, a communication delay caused by the procedure for the terminal to acquire a grant (communication permission) from the base station can be prevented.

The second feature is that in the wireless communication system, wireless signals (reference signals and data signals) are transmitted from a plurality of terminals 2 using the same frequency domain and the same time domain (slot) based on the non-orthogonal multiple access. In this case, each terminal 2 transmits the wireless signals at a transmitting power specified by the base station 1, so that in the base station 1, a desired receiving power difference is generated between the terminals 2. If NOMA is used, the wait time of signal transmission can be decreased. However, in the base station 1, interference between each terminal 2 need be suppressed and cancelled.

Figure 3:
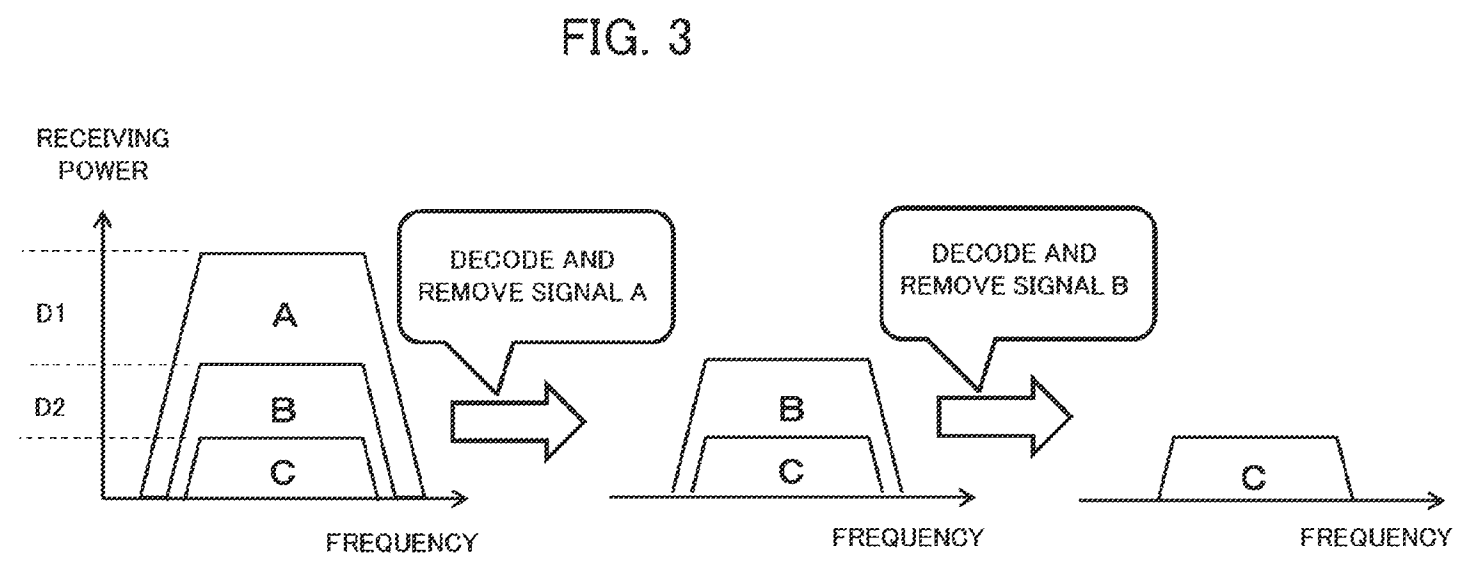

FIG. 3 is an explanatory diagram of power multiplexing and interference suppression and cancellation techniques. In FIG. 3, the diagram on the left schematically indicates the receiving power at the base station 1 of the wireless signals transmitted from terminals A, B and C, which is an example of the plurality of terminals 2. In this example, data signals received from the terminals A, B and C are superimposed with the receiving power at the base station 1 (superimposed signals). The power difference D1 between the receiving power of the terminal A and the receiving power of the terminal B, and the power difference D2 between the receiving power of the terminal B and the receiving power of the terminal C are at least the receiving power difference (required power difference ΔP) between terminals 2 at the base station 1, which is required for appropriate interference suppression and cancellation respectively.

The base station 1 determines the propagation path characteristic based on the reference signal, and performs demodulation and decoding on the superimposed signals using this propagation path characteristic, whereby data from the terminal A can be acquired. The above mentioned wireless communication system, which includes the UL communication using CG and NOMA, and the interference suppression and cancellation techniques (e.g. SIC) is called "simultaneous transmission access boosting low-latency (STABLE)" by the present inventor. The transmission (repetition) control method according to the present invention, however, is also applicable to a wireless communication system for which NOMA other than STABLE is used.

For the algorithm to perform the interference suppression and cancellation of signals from the terminal A from the superimposed signal, the successive interface cancellation (SIC) algorithm is used. SIC is an algorithm that successively determines a signal for each terminal in descending order of the received signal strength indicator (RSSI), and eliminates the signal. The SIC algorithm uses an estimated value of the communication channel (propagation path) characteristic between a terminal 2, which uses a reference signal unique to the terminal 2, and the base station 1. In other words, in processing with the SIC algorithm, the signal transmitted from a terminal 2 of which received signal strength is highest (terminal A) is reproduced (generated) (this signal is called a "replica signal") using the estimated value of she propagation path characteristic, and this signal is subtracted from the superimposed signal. Thereby the interference by the data signal from the terminal A is cancelled (removed) from the superimposed signal (see the diagram at the center in FIG. 3).

Then demodulation and decoding using the propagation path characteristic, based on the reference signal from the terminal B, are performed on the superimposed signal after the data signal from the terminal A is cancelled, whereby the data from the terminal B can be acquired. Further, a replica signal of the data signal transmitted from the terminal B is generated using the SIC algorithm, and the replica signal is subtracted from the superimposed signal, whereby the interference caused by the data signal from the terminal B is cancelled (removed), and a data signal transmitted from the terminal C remains (see the diagram at the right in FIG. 3). Then demodulation and decoding using the propagation path characteristic, based on the reference signal from the terminal C, are performed on the above signal, whereby the data from the terminal C can be acquired.

Repetition

In the wireless communication system, each of the plurality of terminals 2 can perform repetition. "Repetition" refers to repeatedly transmitting a same signal consecutively at a predetermined cycle (e.g. in slot units). A signal transmitted from a terminal 2 by repetition is received and integrated by the base station 1. Adding the received signals by integration improves SNR, and thereby reception quality (propagation loss) improves.

In a case of repetition performed by the plurality of terminals 2 which perform UL communication using a same frequency domain and a same time domain, the number of times of repetition (a number of times of transmitting a same signal, a number of slots to transmit a same signal) N is determined in accordance with a terminal 2 of which receiving power is lowest (transmission loss is largest) among the plurality of terminals 2. N is a natural number.

Figure 4:
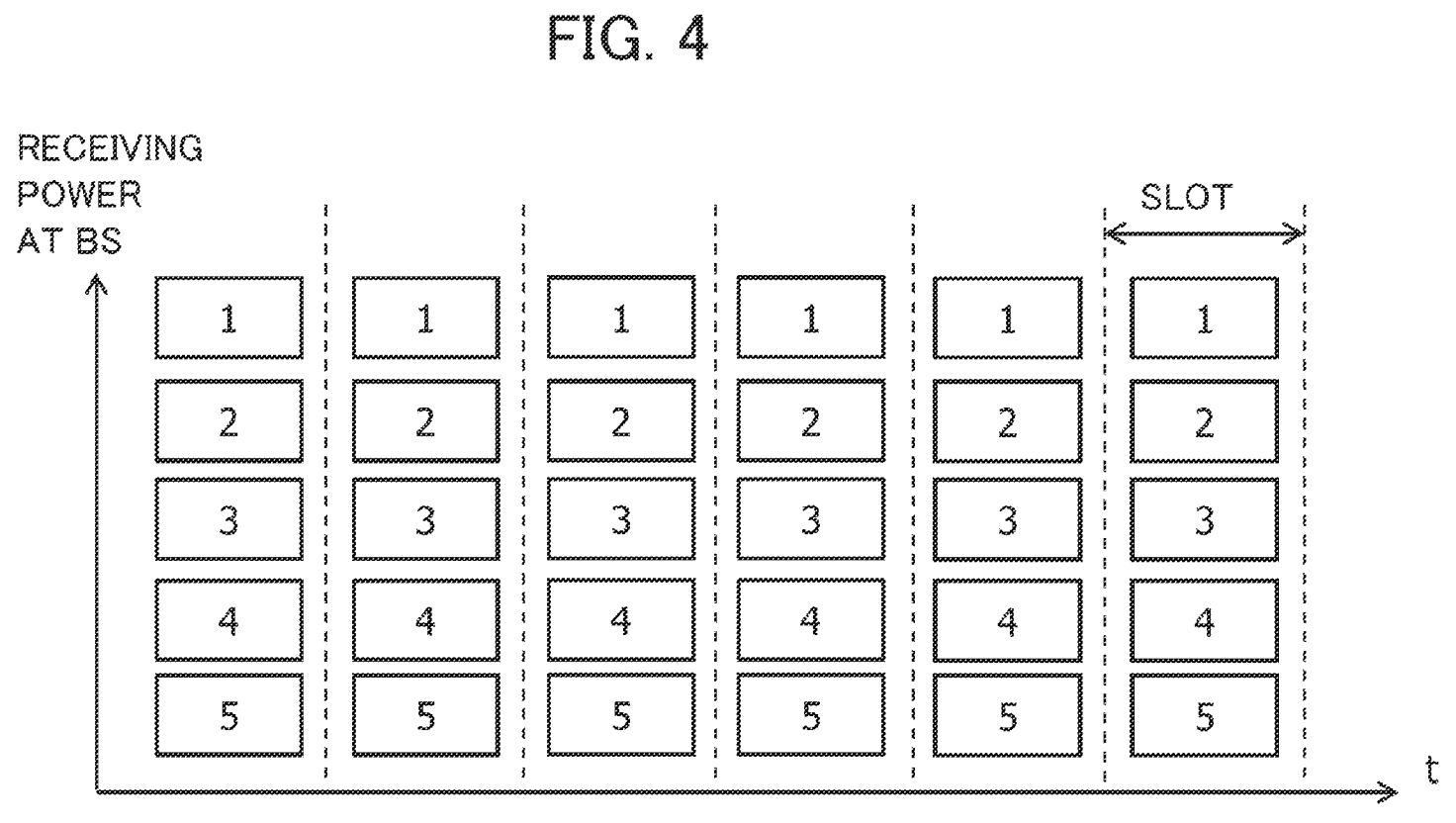

FIG. 4 is a diagram depicting an example of repetition. In FIG. 4, it is assumed that there are 5 (K=5) terminals 2 that perform the communication by NOMA. The identification information (user ID) of each of the 5 terminals 2 is "1", "2", "3", "4" and "5" respectively. The sequence of the numbers of the terminals "1" to "5" is, descending order of the receiving power at the base station 1, and the receiving power of the signal from the terminal "5" is the lowest, that is, propagation loss thereof is large. Therefore the number of times of repetition of the terminal "5" is set to 6 (N=6). In this case, the number of times of repetition N is also set to 6, the same as the number of times of repetition. N of the terminal "5", for the remaining terminals "1" to "4".

However, the receiving power of the terminal "1" is, for example, highest among the 5 terminals 2, hence the number of times of repetition to acquire a desired reception quality (SINR or error rate) by integration is probably lower than the terminal "5". This means that performing transmission for the same number of times of repetition as the terminal "5" leads to an unnecessary waste of power consumption, and is therefore not an ideal repetition. In the following, a wireless communication system that can solve at least the above mentioned problem will be described in detail.

Hardware Configuration

FIG. 5 is a diagram depicting hardware configuration examples of the base station 1 and the terminal 2. In FIG. 5, the base station 1 includes M number of antennas 10 (10-1 to 10-M (M is a natural number)) indicated in FIG. 1A, a radio (wireless processing device) 1*a*, and a control device 1*b*. The control device 1*b* includes a processor 11, a storage device (memory) 12, an internal interface 13, and a network interface 14 to communicate with other base stations and the like.

The processor 11 is also called a "central processing unit (CPU)" or a "microprocessor unit (MPU)". The processor 11 is not limited to a single processor, but may have a multi-processor configuration. In the processor 11, a single physical CPU connected via a single socket may have a multi-core configuration. Further, the processor 11 may include an arithmetic unit having various circuit configurations, such as a digital signal processor (DSP) and a graphics processing unit (GPU). The processor 11 may be linked with an integrated circuit (IC) or other digital circuits or analog circuits. The integrated circuit can be an LSI, an application specific integrated circuit (ASIC), or a programmable logic device (PLD), for example. The PLD is a field-programmable gate array (FPGA), for example. The processor 11 may be a micro-computer (MCU), a system-on a chip (SoC), a system LSI, or a chip set, for example. The processor 11 is an example of the controller (control unit).

The storage device 12 stores an instruction sequence (computer program) executed by the processor 11, data processed by the processor 11, and the like. The internal interface (internal IF) 13 is a circuit to connect various peripheral devices to the processor 11.

The network interface (NW-IF) 14 is a communication device for the base station 1 to access a network to which other base stations are connected. The network to which other base stations are connected is also called a "backhaul". A backhaul is a cable network based on optical communication, for example.

The radio 1*a* includes a transmitter that transmits wireless signals and a receiver that receives wireless signals, and is connected co the antennas 10 (10-1, . . . 10-M). The radio 1*a* may have N number of transmitters and receivers, and the same number of antennas respectively.

In FIG. 5, the terminal 2 includes one antenna 20, the radio (wireless processing device) 2*a*, and the control device 2*b*. The control device 2*b* includes a processor 21, a storage device (memory) 22, an internal interface (internal IF) 23, and a network interface (NW-IF) 24 to communicate with other base stations and the like. The processor 21 is an example of the "controller", and the NW-IF 24 is an example of the "communication unit".

The processor 21, the storage device 22, the internal IF 23, the NW-IF 24 and the radio 2*a* have the same functions as the processor 11, the storage device 12, the internal IF 13, the NW-IF 14 and the radio 1*a* respectively.

Configuration of Terminal

Figure 6:
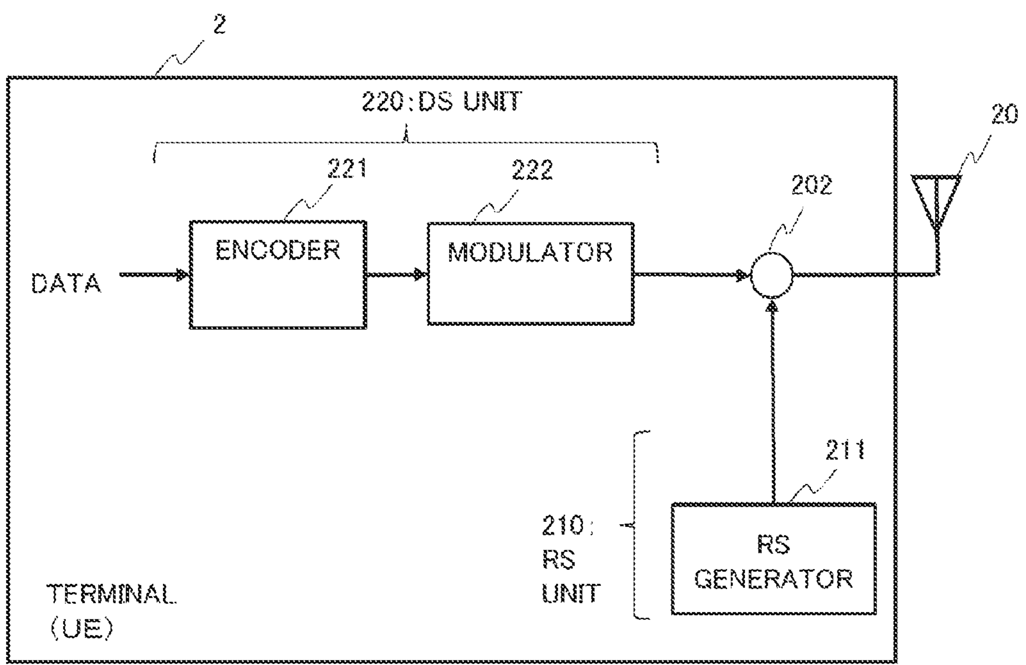
FIG. 6 is a block diagram depicting a configuration example of the terminal.

FIG. 6 is a block diagram depicting a configuration example of the terminal. The terminal 2 operates as a device, including an RS unit 210 and a CS unit 220, by the processor 21 indicated in FIG. 5 executing the programs stored in the storage device 22. The RS unit 210 includes an RS generation unit (RS generator) 211. The RS generation unit 211 generates a reference signal.

The CS unit 220 includes an encoding unit (encoder) 221 and a modulation unit (modulator) 222. The encoding unit 221 performs a predetermined error correction encoding for data that is inputted (user data). The error correction encoding is turbo encoding, for example, but may be a different encoding format. Before turbo encoding, a cyclic redundancy check (CRC), for example, may be performed.

The modulation unit 222 generates data signals by performing digital modulation on the encoded data. The digital modulation method is, for example, quadrature amplitude modulation (QAM), phase shift keying (PSK) or the like. The encoding and modulation methods are selected in accordance with the MCS that is set in the terminal 2.

The terminal 2 further includes a multiplexer (multiplexing unit) 202. The output terminal of the multiplexer 202 is connected to the antenna 20. After outputting the reference signal, the multiplexer 202 switches to output the data signal, whereby the reference signal and the data signal for one slot are connected to the antenna 20. In the respective previous stages of the reference signal and the data signal, a signal block, called the "cyclic prefix (CP)", may be set to compensate for the influence of the delay wave. In the case of the repetition, the data signals are generated so that the same data signal is transmitted from the base station 1 for a specified number of times of repetition (N times). Alternately, a generated data signal may be reproduced and transmitted for a number of times of repetition (N times).

Configuration of Base Station

Figure 7:
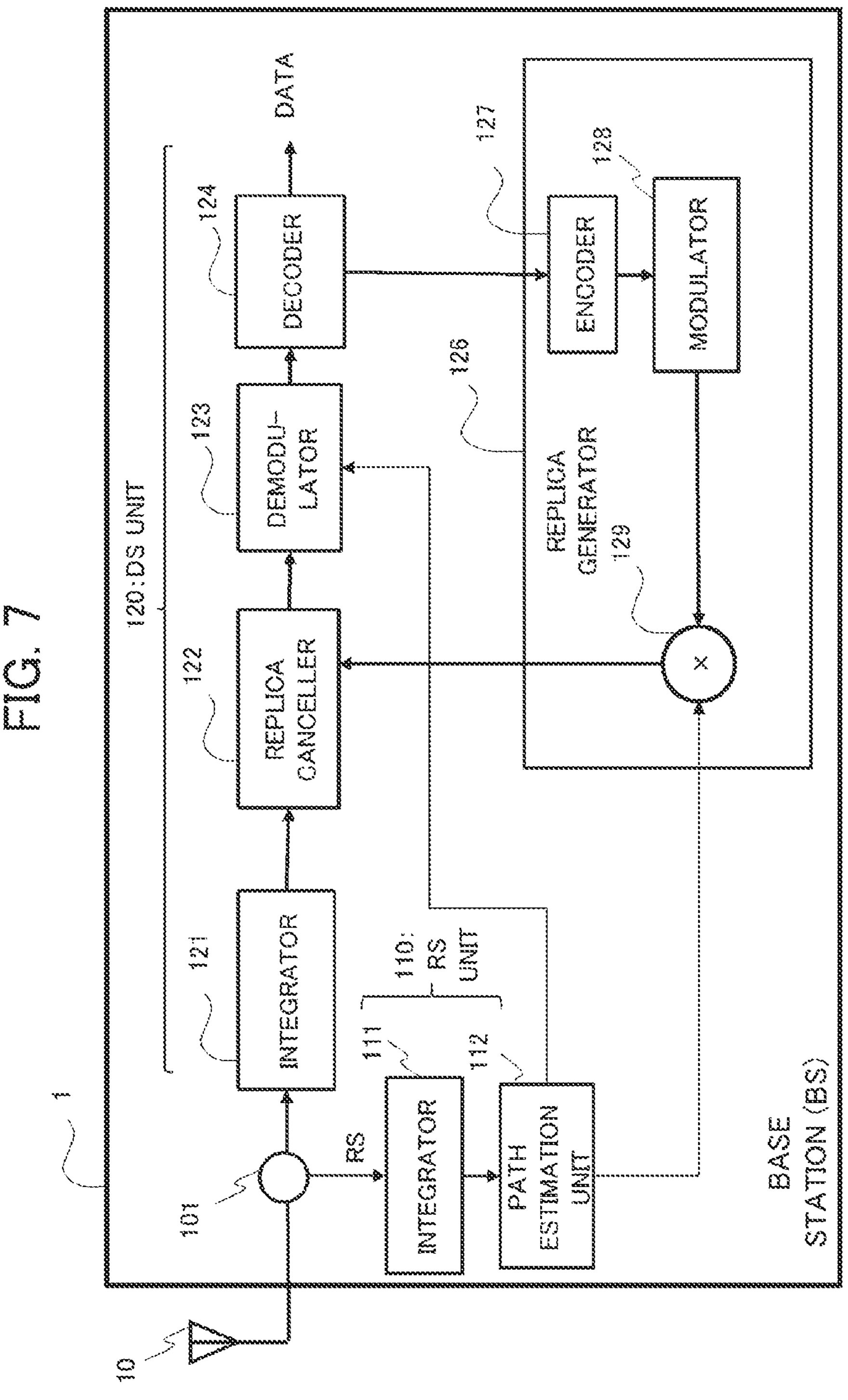
FIG. 7 is a block diagram depicting a configuration example of the base station.

FIG. 7 is a diagram depicting a configuration example of she base station 1. The base station 1 operates as the apparatus having the blocks indicated in FIG. 7 by the processor 11 of the base station 1 executing the programs stored in the storage device 12. As indicated in FIG. 7, the base station 1 includes the antenna 10, a demultiplexer 101, an RS unit 110 and a DS unit 120. Out of the signals received from the antenna 10, the demultiplexer 101, transmits a reference signal to an integration unit 111 of the RS unit 110, and transmits a data signal to an integration unit 121 of the DS unit 120 by a switch operation. At this time, the CPs attached to the reference signal and the data signal are cancelled.

The integration unit 111 acquires a reference signal having sufficient receiving signal power by adding the reference signals received by the repetition. A communication channel estimation unit (channel estimator) 112 calculates an estimated value of the communication channel characteristic (channel vector) using the integrated reference signal. This estimated value is used for demodulation processing by the demodulation unit (demodulator) 123 and for generating the replica signal.

The DS unit 120 includes the integration unit (integrator) 121, a replica cancellation unit (replica canceller) 122, the demodulation unit 123, a decoding unit (decoder) 124 and a replica generation unit (replica generator) 126. The integration unit 121 adds the data signals for a number of times of repetition Nk (N number of slots) assigned to the target terminal 2 (terminal k), so as to improve SNR.

The replica cancellation unit 122 subtracts the replica signal, which was generated by the replica generation unit 126, from the integrated received signals (superimposed signals). The demodulation unit 123 separates the data signal of the target terminal 2 (terminal 2 of which transmitting power value is the maximum, among the terminals which transmitted the superimposed signals) using an estimated value of the communication channel characteristic received from the communication channel estimation unit 112, and performs demodulation on the separated data signal. The decoding unit 124 decodes the data encoded by the encoding unit 221 of the terminal 2, and outputs the original data.

The replica generation unit 126 includes an encoding unit (encoder) 127, a modulation unit (modulator) 128 and a multiplication unit 129. The encoding unit 127 and the modulation unit 128 perform the encoding and digital modulation, which were performed in the terminal 2, on the data outputted from the decoding unit 124. The multiplication unit 129 multiplies the modulated data by the estimated value of the communication channel characteristic between the target terminal 2 (terminal 2 which transmitted the decoded data) and the base station 1. Thereby the replica signal is generated. The replica signal is supplied to the replica cancellation unit 122.

Calculation of Number of Times of Repetition and Transmitting Power

Figure 8:
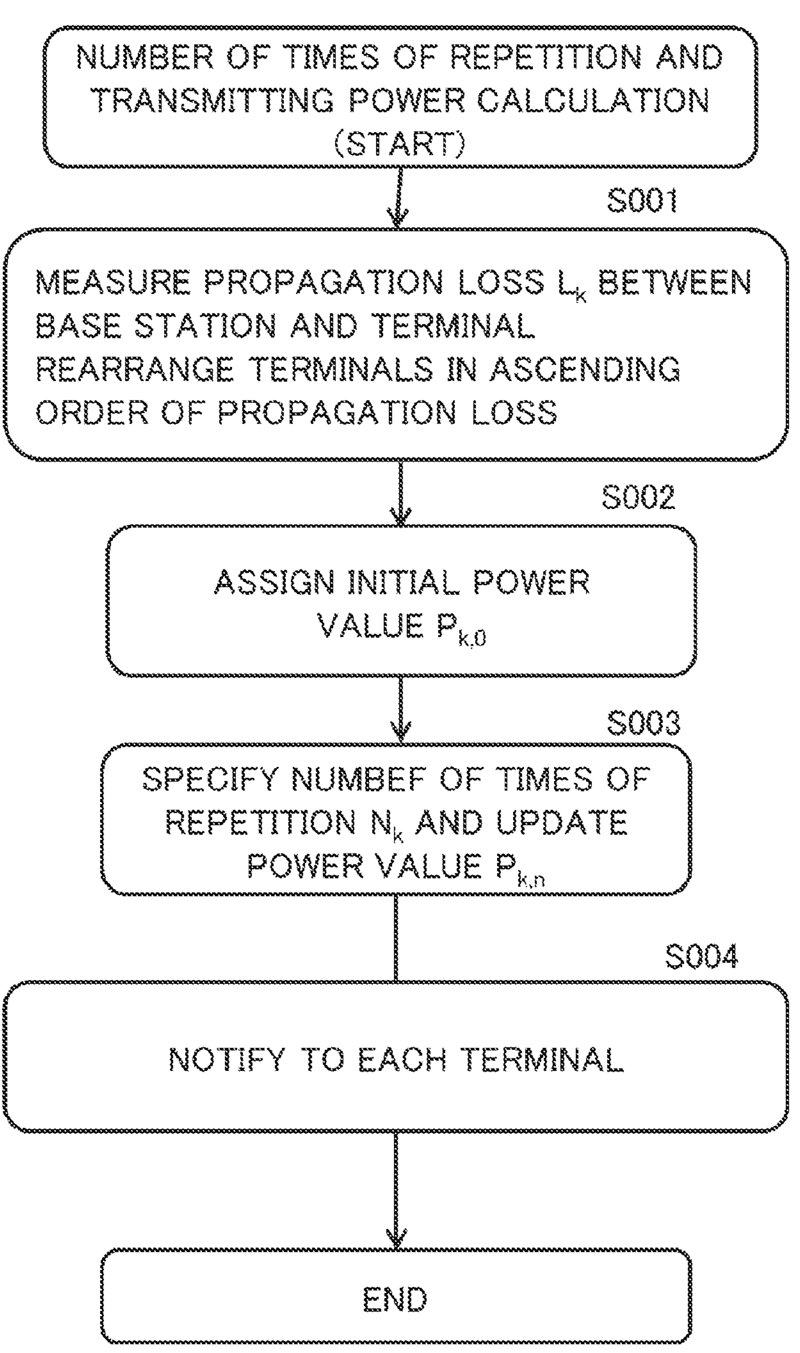
FIG. 8 is a flow chart depicting an example of processing at the base station (calculation of a number of times of repetition and transmitting power used each time)

FIG. 8 is a flow chart depicting a processing example in the base station (calculation of a number of times of repetition and transmitting power value used for each time of repetition). The processing in FIG. 8 is performed by the processor 11 of the base station 1, for example. This processing is performed in a case where a plurality of terminals 2 transmit data to the base station 1, for example, and is started at a timing when the base station 1 received, via a UL control channel, a transmission request for the data signal from a terminal 2. The start trigger, however, is not limited to this. The input parameters to the processor 11 are as follows.

Terminal ID (user ID) k: k is a value in a range from a minimum value "0" to a maximum value "K−1"

Maximum number of times of repetition Nmax: a maximum number of times of repetition that can be performed in the wireless communication system. For example, operation at 32 times of repetition is under consideration for 5G. The maximum number of times of repetition can be set as needed, and may be 32 or may be more or less than 32.

Block error rate (BLER) characteristic S(γ) with respect to SINR and MCS

Target value Starget of BLER

Maximum transmitting power Pmax, UE: the maximum value of the transmitting power that the terminal 2 is allowed to use.

Noise power PN at the base station

Required power difference ΔP: receiving power difference between terminals at the base station, which is required to perform appropriate interference suppression and cancellation The input parameters are stored in the storage device 12, for example. The BLER characteristic with respect to the SINR is provided in the storage device 12 as a correspondence table, for example, and the BLER characteristic with respect to the inputted SINR is retrieved. The input parameters may be stored at a location other than the storage device 12. Further, the processor 11 may acquire a part or all of the input parameters from a network.

In step S001, the processor 11 measures the propagation loss Lk between the base station 1 and each terminal 2, for a plurality of (K number of) terminals 2, which performs it communication using NOMA. The processor 11 also arranges the K number of terminals 2 in ascending order of the propagation loss Lk (in descending order of reception quality).

In step S002, the processor 11 assigns the initial value of the transmitting power (initial power value Pk,0) to each of the K number of terminals 2.

In step S003, the processor 11 specifies a number of times of repetition Nk, and updates the transmitting power value Pk,n for each of the K number of terminals 2. At the point when step S003 ends, the output parameters from the processor 11 are as follows.

The number of times of repetition Nk specified for each of the K number of terminals 2 (terminals having terminal ID: k=0 to K−1)

Transmitting power value Pk,n (n=1 to maximum number of times of repetition max(Nk)) used for each time of repetition performed by each of the K number of terminals 2.

In step S004, the base station 1 notifies (transmits) information including the output parameters to each of the plurality of terminals 2 via the DL control channel. At this time, in the information to be notified, the base station 1 can include the information that indicates the repetition starting slot and the frequency channel to be used.

Figure 9:
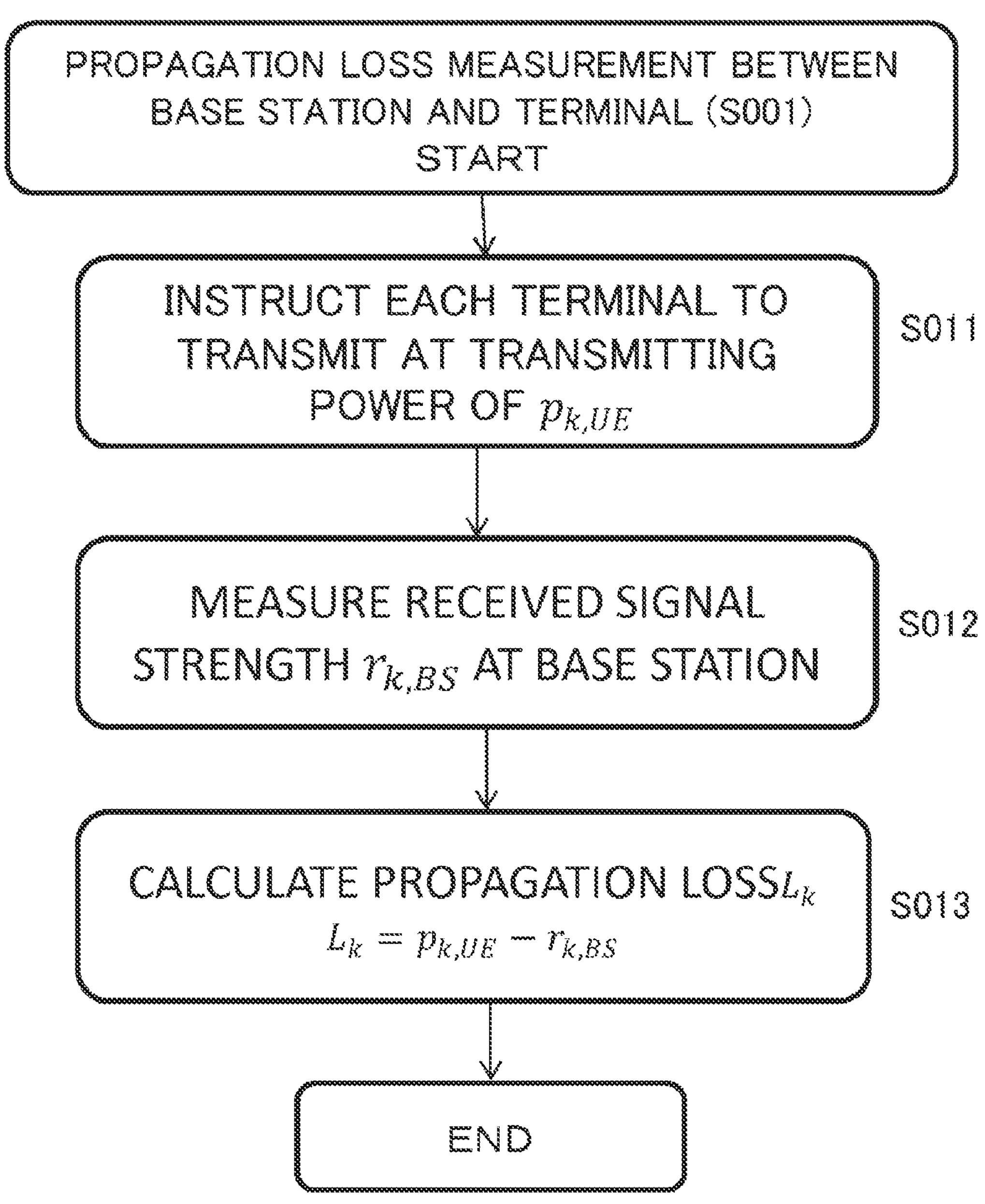
FIG. 9 is a flow chart exemplifying details of step S001 (Example 1) in FIG. 8.

FIG. 9 is a flow chart exemplifying details of step S001 (Example 1) in FIG. 8. In step S011, the processor 11 instructs each terminal 2 to set the transmitting power in the transmitting power value pk,UE, and to transmit a control signal. This instruction is transmitted via the DL control channel.

In step S012, the processor 11 measures the received signal strength rk,BS of the control signal which each terminal 2 transmitted to the base station 1 via the UL control channel.

In step S013, the processor 11 calculates the propagation loss Lk between the terminal 2 and the base station 1 by subtracting the received signal strength rk,BS from the transmitting power value pk,UE. In the case where the base station 1 includes a plurality of antennas 10, an average value of the propagation loss related co the received signal by each antenna 10 may be used as the propagation loss Lk in step S013.

Figure 10:
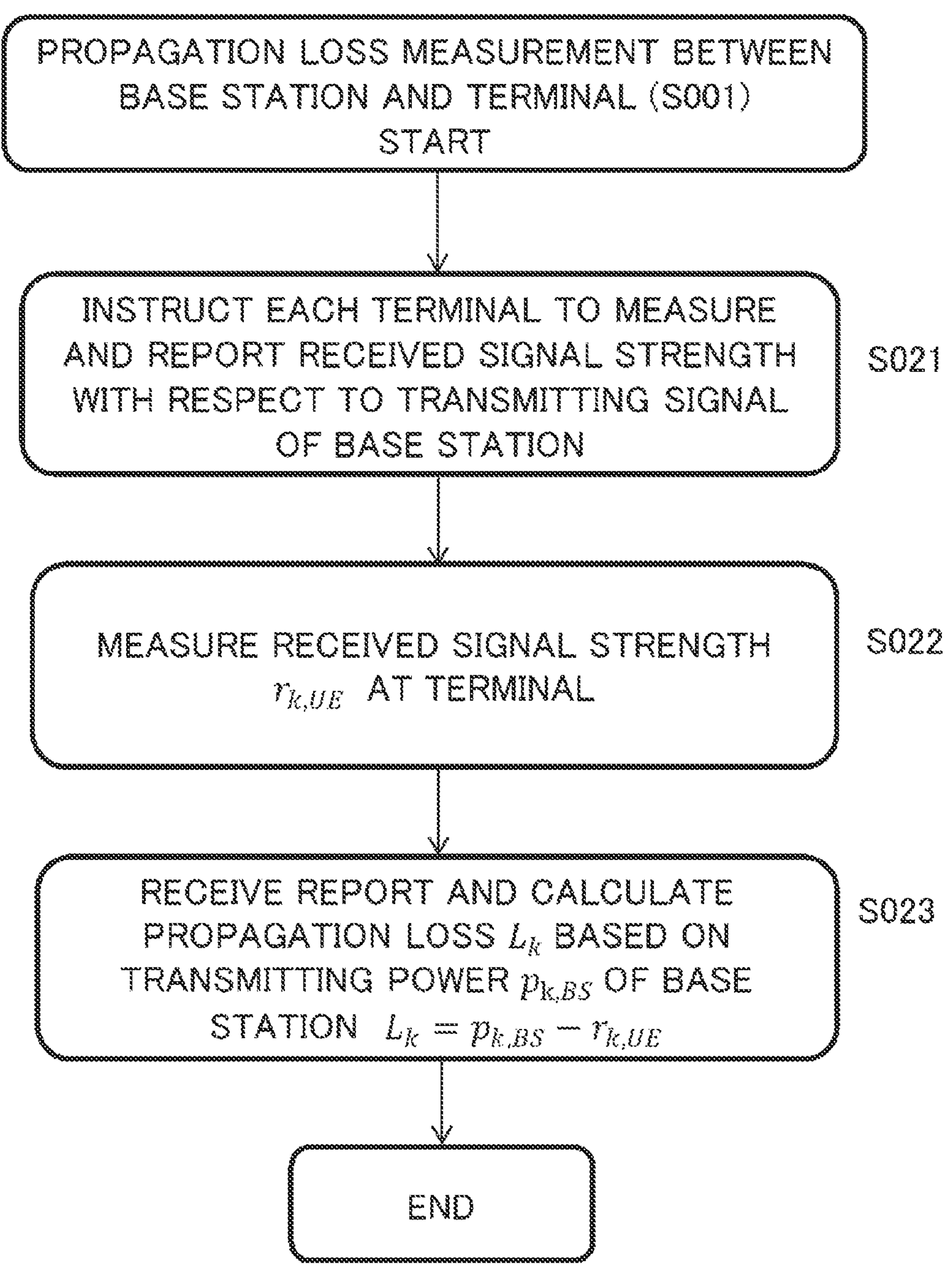
FIG. 10 is a flow chart exemplifying details of step S001 (Example 2) in FIG. 8.

FIG. 10 is a flow chart exemplifying details of step S001 (Example 2) in FIG. 8. In step S021, the processor 11 instructs each terminal 2, via the DL control channel, to measure and report the received signal strength with respect to the transmitting signal (specified transmitting signal) to the terminal 2 specified by the base station 1.

In step S022, each terminal 2 measures the received signal strength rk,UE with respect to the specified transmitting signal transmitted from the base station 1. Each terminal 2 transmits a report, including the measurement result of the received signal strength rk,UE, to the base station 1 via the UL control channel.

In step S023, the processor 11 of the base station 1 receives the report from each terminal 2, and calculates the propagation loss Lk related to each terminal 2 by subtracting she received signal strength rk,UE included in the report from the transmitting power value pk,BS of the specified transmitting signal at the base station 1. To calculate the propagation loss Lk, either Example 1 or Example 2 may be used.

Figure 11:
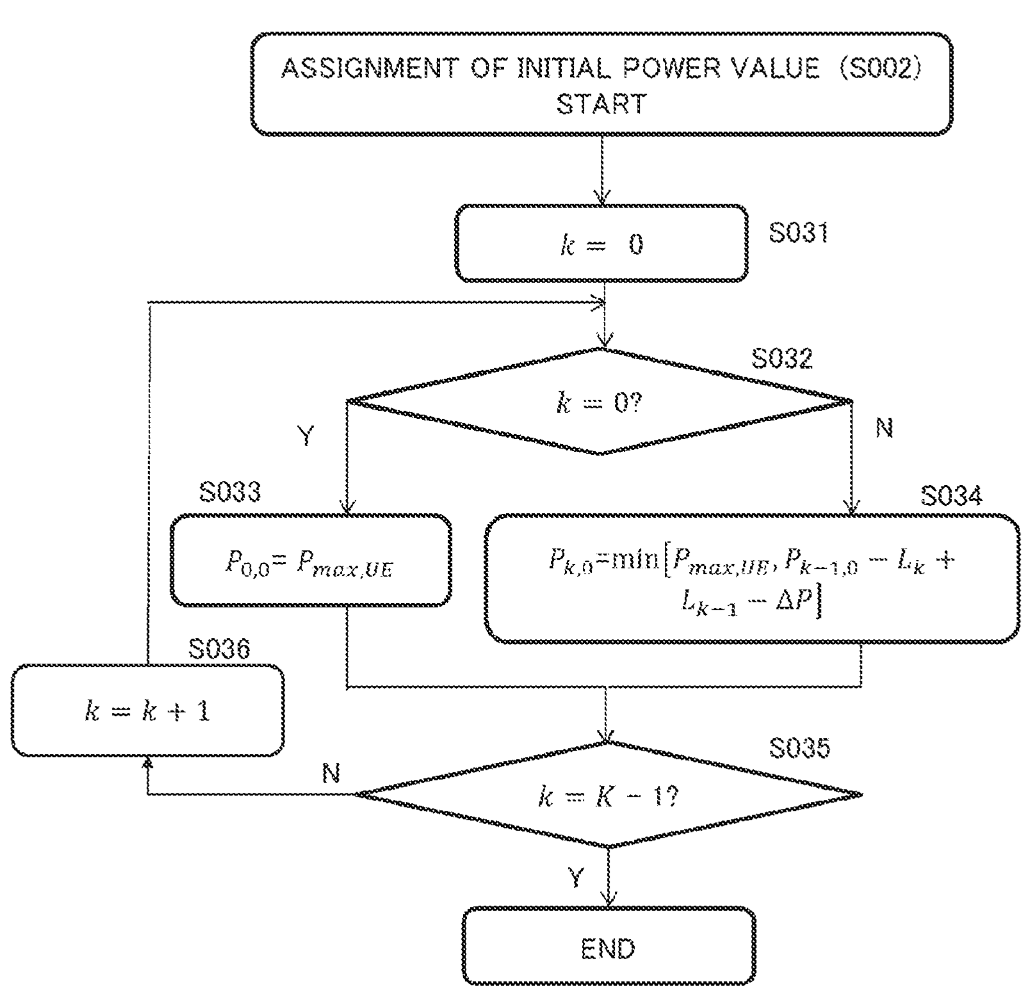
FIG. 11 is a flow chart exemplifying details of step S002 in FIG. 8.

FIG. 11 is a flow chart exemplifying details of step S002 in FIG. 8. In step S031, the processor 11 sets a value of k, which specifies one of the K number of terminals 2 (terminal #0 to #K−1), to 0. Then a value of k=0 to K−1, which is a terminal ID, is assigned to the K number of terminals 2 in ascending order of the propagation loss Lk. The terminal 2 of k=0 indicates a terminal 2 of which propagation loss Lk is minimum.

In step S032, the processor 11 determines whether the current value of k is 0, which is the minimum value of k. Processing advances to S033 if it is determined that the value of k is 0, or processing advances to S034 if not.

In step S033, the processor 11 sets the initial power value P0,0 to the maximum transmitting power Pmax, UE for the terminal 2 of k–0. However, a desired value lower than the maximum transmitting power Pmax,UE may be used instead of Pmax, UE. Then processing advances to step S035.

In the case where processing advances to step S034, the processor 11 determines the initial power value Pk, 0 of the terminal 2 to a lower value out of the following first value and the second value.

First value: maximum transmitting power Pmax, UL of terminal 2

Second value: a value determined by subtracting the difference between the propagation loss Lk of the terminal 2 of k (terminal k) and the propagation loss Lk−1 of the terminal 2 of k−1 (terminal k−1); and the required power difference ΔP, from the power value Pk−1,0 of the terminal k−1

The second value becomes a lower value than the first value. The second value becomes a value that is at least the required power difference ΔP, so that a sufficient power difference is acquired between the terminals 2.

In step S035, the processor 11 determines whether the current value of k is K−1 (maximum value of k). The flow in FIG. 11 ends if it is determined that the value of k is K−1, or processing advances to step S036 if not. In step S036, the value of k is incremented (1 is added to the current value of k), and processing returns to step S032.

Figure 12:
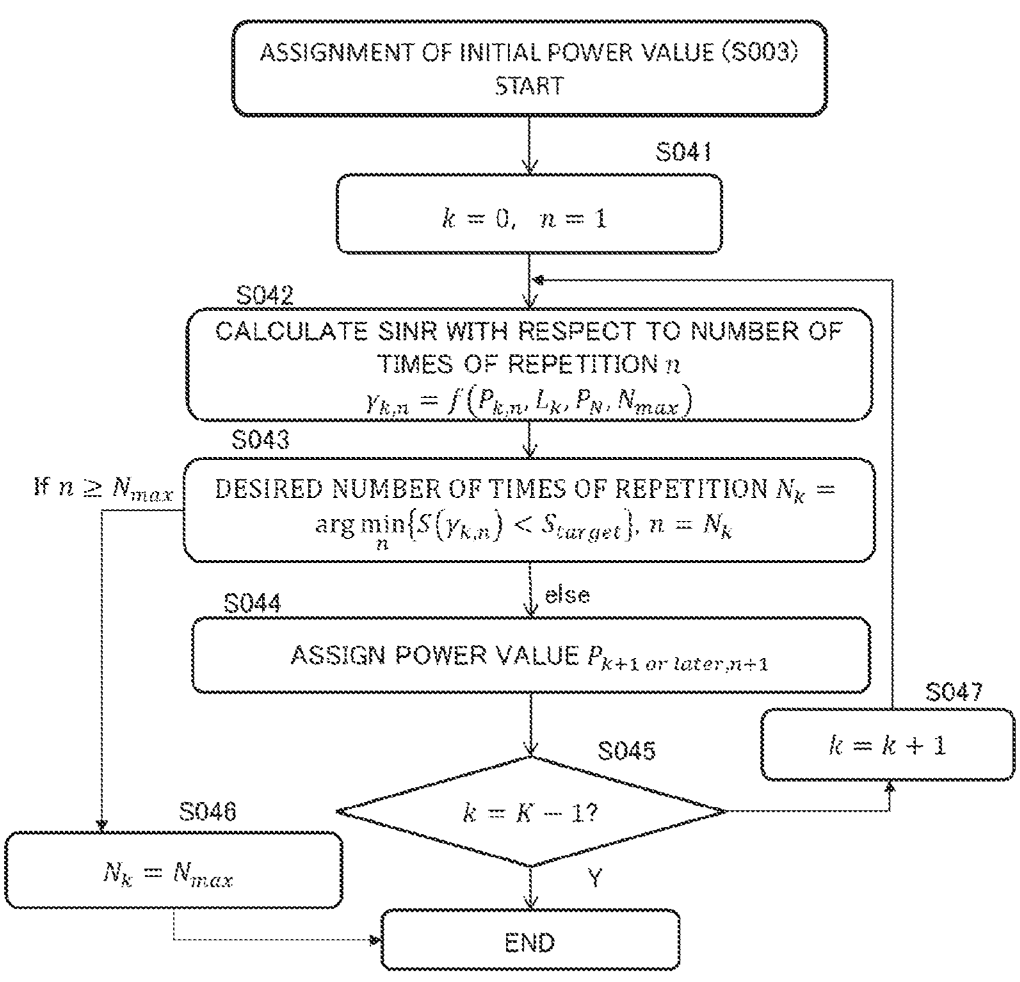
FIG. 12 is a flow chart exemplifying details of step S003 in FIG. 8.

FIG. 12 is a flow chart exemplifying details of step S003 in FIG. 8. In step S041, the processor 11 sets a value of the terminal k to 0, and sets the value of the number of times of repetition n to 1.

In step S042, the SINR γk,n with respect to the number of times of repetition is calculated. The value of γk,n can be calculated using the formula indicated in FIG. 13. In other words, the value of γk,n is calculated by subtracting the value of B and the value of Pn from the value of A in the formula. The value of A in the formula is a power value (integrated value) after the terminal 2 of the terminal ID=k performed n times of repetition. The value B in the formula is the interference power which is received from the terminals 2 other than the terminal 2 of the terminal ID=k. Pn is the noise power of the base station 1, as mentioned above.

In step S043, the processor 11 calculates the value of the desired number of times of repetition Nk. For the desired number of times of repetition Nk, a minimum value of F, when the BLER characteristic S(γ), with respect to SINR calculated in step S043, becomes lower than the target value Starget of BLER, is determined, and this value of n is set to Nk. This means that after the terminal 2 having the current value of k performs NI times of repetition, the repetition is stopped (repetition is not performed in the next slot). Then processing advances to step S044.

If the determined value of n is the maximum number of times of repetition Nmax or more in step S043, however, processing advances to step S046. In step S046, the processor 11 sets the value of Nk to Nmax. Then the flow in FIG. 12 ends.

In step S044, after the power value $P_{k+1\ or\ later,\ n+1}$ is assigned. In other words, for the value k+1 or later terminals 2 (k is a current value), the processor 11 assigns the transmitting power value in the next slot n+1 after the number of times of repetition n=Nk calculated in step S043 is performed. The transmitting power value can be calculated in the same manner as the processing in step S002 (flow of S031 to S036 in FIG. 11). This processing, however, is performed for the remaining terminals 2, excluding the terminal 2 for which a desired number of times of repetition Nk has been set (terminal 2 which does not perform repetition in the next slot n+1), in a state where terminal IDs: 0 to K−1 are as to these terminals 2 in ascending order of the propagation loss Lk.

In step S045, the processor 11 determines whether the current value of k is K−1. The flow in FIG. 12 ends it is determined that the value of k is K−1, or processing advances to step S047 if not. In step S047, the processor 11 increments the value of k, and processing returns to step S042.

Figure 14:
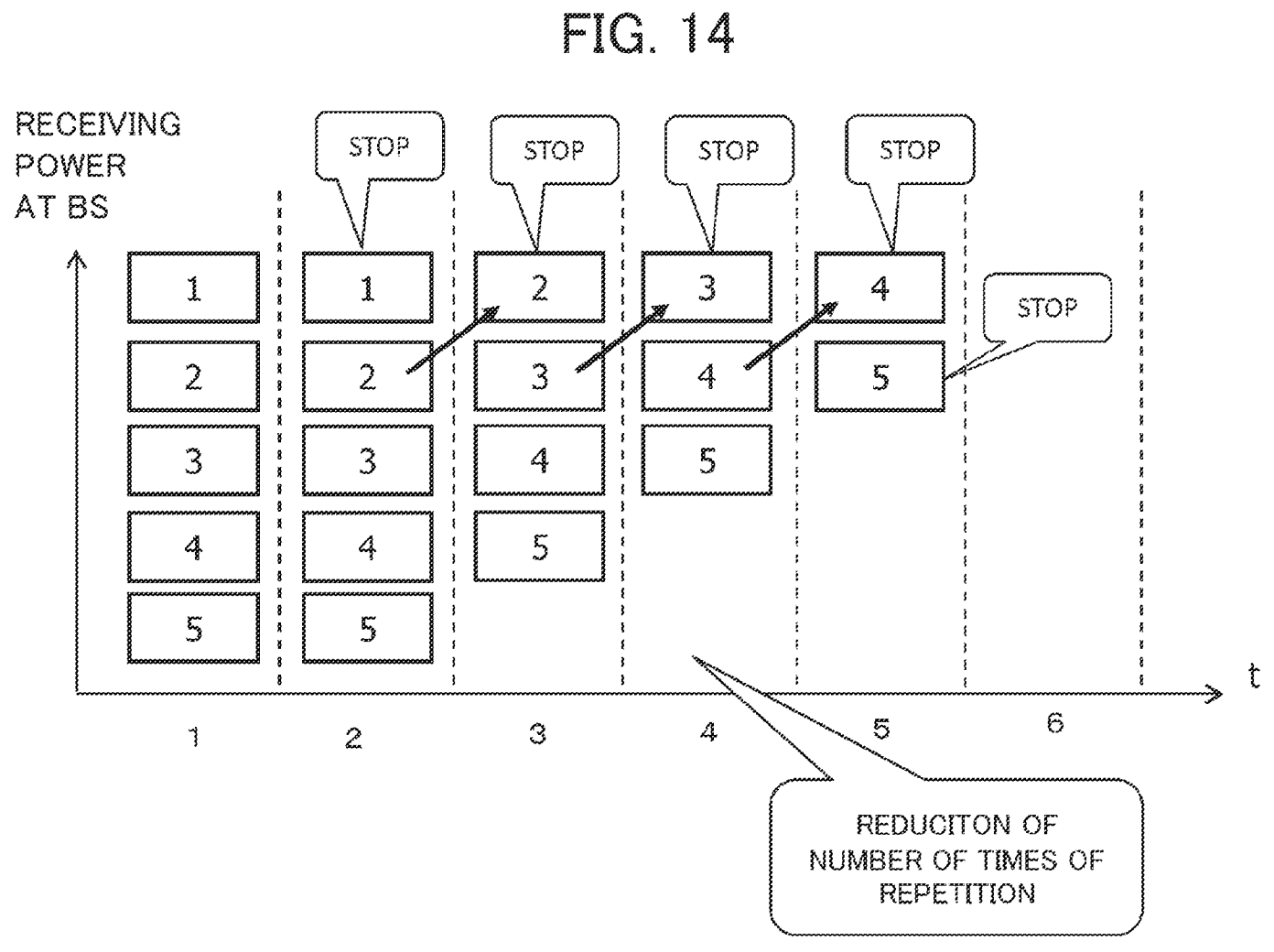

FIG. 14 is a diagram depicting an example of a modified repetition executed in the wireless communication system. When the processing steps related to the flow charts in FIGS. 8 to 12 are performed on the terminals 2 of which terminal IDs are "1" to "5" indicated in FIG. 4, the following operation is performed. That is, the terminals "1" to "5" are arranged in ascending order of the propagation loss Lk (step S001), then the initial power value is assigned to the terminals "1" to "5" respectively (step S002). At this time, she maximum transmitting power is assigned to the terminal "1" of which propagation loss Lk is minimum, and the initial power values are set for the terminals "2" to "5" so that the power difference that is at least the required power difference ΔP is generated in the receiving power values at the base station 1.

Then in the flow in FIG. 12 related to step S003, the desired number of times of repetition ilk of the terminal "1" is set to 2 (step S043), the repetition by the terminal "1" is performed using the first slot (n=1) and the second slot (n=2) in FIG. 14, and stops with the slot of n=2.

At this time, the transmitting power values that are assigned to the remaining terminals "2" to "5" other than she terminal "1" are updated for the next slot n=3 (step S044). Here the transmitting power value of the terminal "2" is updated to the maximum transmitting power, and the transmitting power values of the terminals "3" to "5" are set to values so that the power difference of at least the required power difference ΔP is generated in the receiving power values at the base station 1. Thereby the receiving power values of the terminals "2" to "5" in the slot n=3 are increased respectively.

In the case where the number of times of repetition Nk of the terminal "2" is set to 3 in the subsequent step S043, the repetition performed by the terminal "2" stops with the slot n=3. Therefore in the next slot n=4, the transmitting power values of the remaining terminals "3" to "5" are updated to higher values respectively (step S044), whereby the receiving power at the base station 1 increases.

In the case where the number of times of repetition Nk of the terminal "3" is set to 4 in the subsequent step S043, the repetition performed by the terminal "3" stops with the slot n=4. Therefore in the next slot n=5, the transmitting power values of the remaining terminals "4" and "5" are updated to higher values respectively (step S044), whereby the receiving power at the base station 1 increases.

In the case where the number of times of repetition Nk of the terminal "4" is set to 5 in the subsequent step S043, the repetition performed by the terminal "4" stops with the slot n=5. Therefore in the next slot n=6, the transmitting power value of the remaining terminal "5" is updated to a higher value (step S044). In the present embodiment, in the subsequent step S043, the number of times of repetition Nk of the terminal "5" is set to 5. In this case, the number of times of repetition of the terminal "5" stops with the slot n=5, hence the base station 1 does not notify the transmitting power value that is used in slot n=6 to the terminal "5".

Figure 13:
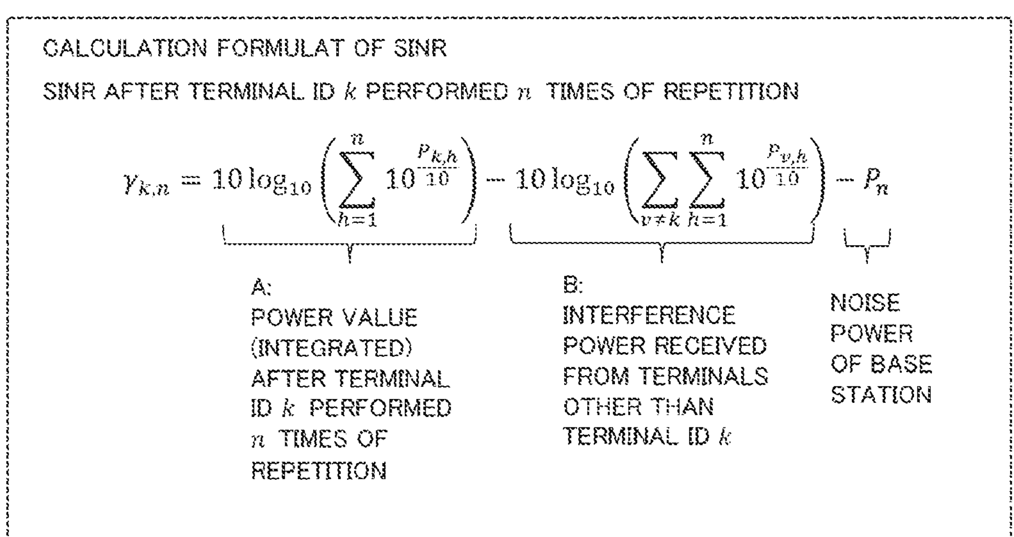
FIG. 13 is a description of a calculation formula of SINR.

Therefore in the example indicated in FIG. 13, the signal related to the repetition performed in slot n=6 is not transmitted. Hence the slot n=6 can be effectively used for other purposes. Further, a number of times of repetition performed by each of the terminals "1" to "5" decreases, whereby the power consumption can be reduced. Further, the transmitting power values are updated to be higher for the terminals "2" to "5", hence the receiving power increases and reception quality improves. In this way, the terminals "1" to "5" (a plurality of terminals 2) can perform good repetition transmission.

Figure 15:
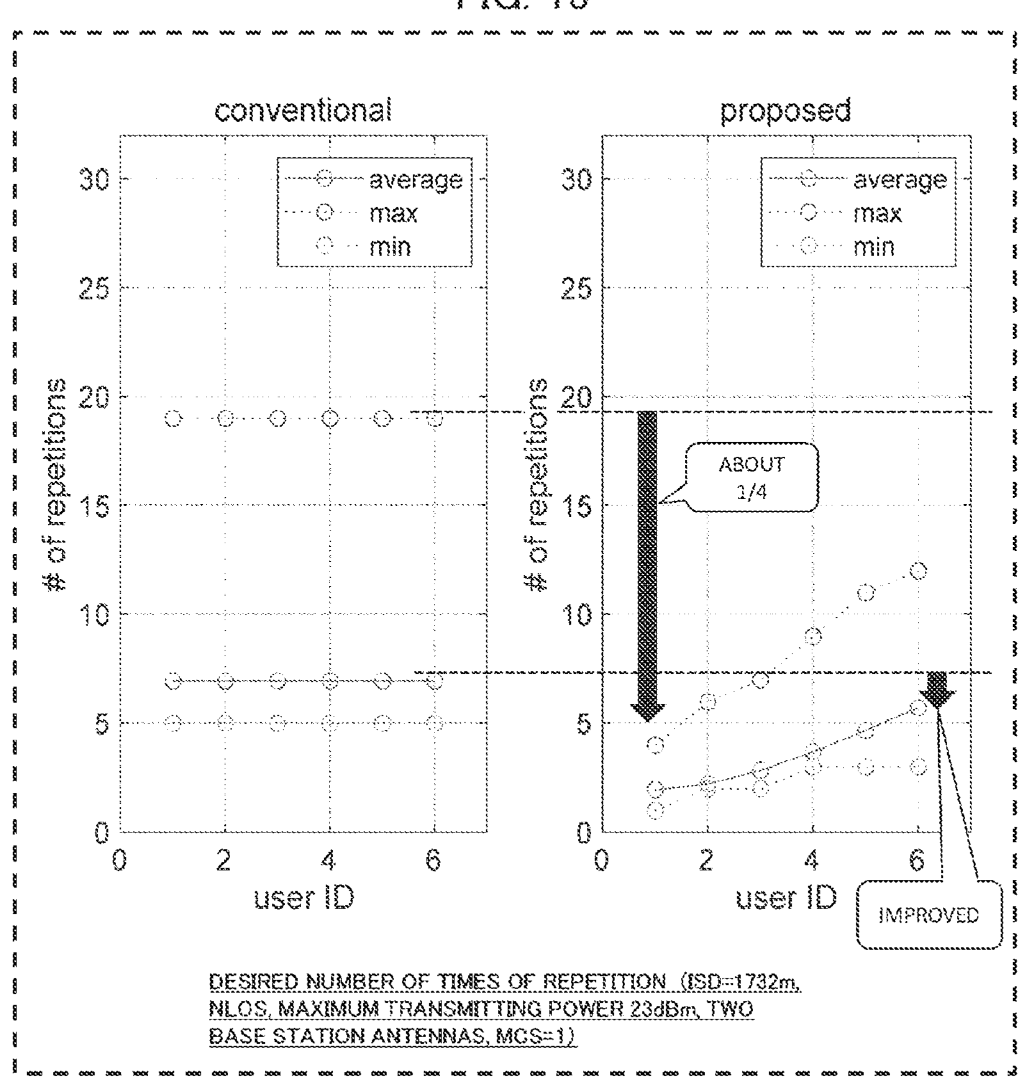
FIG. 15 is a diagram depicting an experiment example related so the repetition.

FIG. 15 is a diagram depicting an experiment example related to the repetition using the wireless communication system according to the present embodiment. The environment of the experiment example is as follows.

Inter-site distance (IEM): 1732 m

Non-line-of-sight (NLOS) environment

Maximum transmitting power: 23 dBm

Number of antennas at base station 1: 2

MCS=1

In the graph at the left of FIG. 15, a plurality of user IDs (terminals 2) "1" to "6" are arranged in ascending order of the propagation loss. The ordinate of the graph is a number of times of repetition. In a case of setting a same number of times of repetition for the plurality of terminals 2, the minimum value, the maximum value and the mean value of the number of times of repetition in the user IDs "1" to "6" become constant regardless the value of the propagation loss. In the graph at the right, on the other hand, if the processing steps in FIGS. 8 to 12 are performed for the terminals 2 of the user IDs "1" to "6", the smaller the propagation loss the less the desired number of times of repetition. The number of times of repetitions in the graph at the right is decreased to about ¼ at the maximum compared with the graph at the left. The mean value of the number of times of repetition also decreases, that is, an improvement is observed.

Functional Effect of Embodiment

The wireless communication system according to the present embodiment includes a plurality of transmitting stations (terminals 2) which are connected to the wireless communication partner receiving station (base station 1) by non-orthogonal multiple access (FIGS. 1A and 1B). Each of the plurality of terminals 2 can transmit a same signal successively to the base station 1 by repetition for a predetermined number of times at a predetermined cycle (slot), which is common to the plurality of terminals 2 (FIG. 4).

The information processing apparatus included in the base station 1, that is, a control device 1*b* including the processor 11, calculates an initial value of transmitting power so be assigned to each of the plurality of terminals 2, so that the better the reception quality (smaller the propagation loss) at the base station 1 the higher the initial value, and that a receiving power difference (required power difference required between terminals 2 at the base station 1 can be ensured (S002 in FIG. 8, FIG. 11). The control device 1*b* also calculates a number of times of repetition of the first transmitting station (terminal 2 of k=0) to which the maximum initial value of the transmitting power is assigned, out of the plurality of terminals 2, based on an index value (SINR) of the reception quality at the base station 1 (S043 in FIG. 12).

According to the above configuration, the number of times of repetition performed by the terminal 2 of which the propagation loss is minimum (to which the maximum initial value of the transmitting power is assigned) can be decreased, compared with the case where the number of times of repetition performed by each of the plurality of terminals 2 is set to the same number of times of repetition of the terminal 2 of which propagation loss is largest among the plurality of terminals 2. As a result, the power consumption of this terminal 2 can be reduced. In other words, good repetition transmission can be performed.

In the embodiment, the control device 1*b* or the processor 11 further executes steps of: eliminating the terminal 2 to which the desired number of times of repetition is set (corresponding to the first transmitting station) out of the plurality of terminals 2; and calculating, for each of the remaining terminals 2, a number of times of repetition and the transmitting power that is used after the elimination (S044 in FIG. 12). Thereby a number of times of repetition performed by each of the remaining terminals 2 can be decreased. Further, by the decrease in the number of times of repetition, a number of cycles (slots) used for the repetition can be decreased, and resources can be used efficiently.

In the embodiment, the control device 1*b* or the processor 11 can assign, to each of the remaining terminals 2, transmitting power that is higher than the previous transmitting power, which was assigned before eliminating the terminal 2 in which the desired number of times of repetition is set. Since the transmitting power increases, the reception quality (SINR or error rate) can be improved at the base station 1 (S044 in FIG. 12, S033 in FIG. 11).

In the embodiment, the control device 1*b* or the processor 11 can calculate the propagation loss using the received signal strength at the base station 1 in a case where each of the plurality of terminals 2 transmitted a signal to the base station 1 at a predetermined transmitting power (FIG. 9).

In the embodiment, the control device 1*b* or the processor 11 can calculate the propagation loss using the received signal strength at each of the plurality of terminals 2 in a case where the base station 1 transmitted a signal to each of the plurality of terminals 2 at a predetermined transmitting power (FIG. 10).

In the embodiment, in the assignment of the transmitting power, the control device 1*b* or the processor 11 assigns a maximum assignable transmitting power to a transmitting station of which reception quality is the best (a terminal 2 of which propagation loss is minimum) among the plurality of terminals 2. Further, the control device 1*b* or the processor 11 calculates a transmitting power, which is assigned to each of the transmitting stations (terminals 2) remaining after eliminating the transmitting station of which reception quality is the best, so that the required power difference $\Delta P$ is ensured in a range of power that is lower than the maximum transmitting power (S034 in FIG. 11).

In the embodiment, in the calculation of a number of times of repetition at the terminal 2 to which the maximum transmitting power is assigned among the plurality of terminals 2, the control device 1*b* or the processor 11 calculates the reception quality ($S(\gamma)$) for different number of times of repetition n. Then the control device 1*b* or the processor 11 determines the number of times of repetition of the terminal 2 to the minimum number of times of repetition with which the reception quality acquired by the calculation satisfies a desired reception quality (S target) (S043 in FIG. 12).

In the embodiment, the base station 1, that is the receiving station, can transmit. Information, which includes a number of times of repetition assigned to each of the plurality of terminals 2 and the transmitting power used for each time of repetition, to each of the plurality of terminals 2 via a down control channel (S004 in FIG. 8). Thereby each of the plurality of terminals 2 can perform repetition using the transmitting power in accordance with this information.

The processing and means described in the present disclosure may be freely combined and used as long as technical inconsistency is not generated. A processing step which was described based on the assumption that one device executes that step may be shared by a plurality of devices. Further, a processing step which was described based on the assumption that difference devices execute that step may be executed by one device. In the computer system, a kind of hardware configuration (server configuration) that implements each function may be freely changed.

The present disclosure may also be implemented by supplying a computer program storing the functions described in the above embodiment to a computer, and one or more processors included in the computer reading and executing the program. This computer program may be provided to the computer by a non-transitory computer-readable storage medium that can be connected to the system bus of the computer, or may be provided to the computer via a network. The non-transitory computer-readable storage medium is an arbitrary type of disk, such as a magnetic disk (e.g. Floppy® disk, hard disk drive (HDD)) and an optical disk (e.g. CD-ROM, DVD disk, Blu-ray disk), a read only memory (ROM), a random access memory (RAM), an EPROM, an EEPROM, a magnetic card, a flash memory, an optical card, and an arbitrary type of medium suitable for storing electronic instructions.

What is claimed is:

1. A method for controlling transmissions from a plurality of transmitting stations connected to a receiving station by non-orthogonal multiple access, each of the plurality of transmitting stations being capable of transmitting a same signal successively to the receiving station by repetition for a predetermined number of times at a predetermined cycle which is common to the plurality of transmitting stations, the method comprising:

calculating an initial value of transmitting power to be assigned to each of the plurality of transmitting stations such that a transmitting station with a higher reception quality at the receiving station is assigned a higher initial transmitting power value than a transmitting station with a lower reception quality at the receiving station, and a difference in received power between signals received at the receiving station from different transmitting stations is ensured;

identifying, among the plurality of transmitting stations, a first transmitting station to which a maximum initial transmitting power value is assigned; and calculating, based on a reception quality of signals received at the receiving station from the first transmitting station, a repetition count of transmissions from the first transmitting station.

2. The method according to claim 1, further comprising:

eliminating the first transmitting station from the plurality of transmitting stations; and calculating, for each of the remaining transmitting stations, a repetition count and a transmitting power that is used after the elimination.

3. The method according to claim 2, further comprising:

assigning, to each of the remaining transmitting stations, a transmitting power that is higher than a transmitting power which was assigned before the elimination.

4. The method according to claim 1, wherein a reception quality of each of the transmitting stations at the receiving station comprises a propagation loss between the receiving station and each of the plurality of transmitting stations.

5. The method according to claim 4, further comprising:

calculating the propagation loss using a received signal strength at the receiving station in a case where each of the plurality of transmitting stations transmitted a signal to the receiving station at a predetermined transmitting power.

6. The method according to claim 4, further comprising:

calculating the propagation loss using a received signal strength at each of the plurality of transmitting stations in a case where the receiving station transmitted a signal to each of the plurality of transmitting stations at a predetermined transmitting power.

7. The method according to claim 1, further comprising:

eliminating the first transmitting station from the plurality of transmitting stations; and calculating, for each of the remaining transmitting stations, a transmitting power such that a difference in received power between signals originating from the remaining transmitting stations at the receiving station is in a range of power lower than the maximum initial transmitting power.

8. The method according to claim 1, wherein calculating the repetition count of transmissions from the first transmitting station further comprises:

calculating reception quality of each of repeated transmissions at the receiving station; and determining the repetition count to be a minimum repetition count under which a reception quality acquired by the calculating satisfies a predetermined reception quality.

9. The method according to claim 1, wherein information is transmitted from the receiving station to each of the plurality of transmitting stations via a downlink control channel, the information including a repetition count assigned to each of the plurality of transmitting stations and a transmitting power to be used for each of repeated transmissions.

10. An information processing apparatus configured to control transmissions from a plurality of transmitting stations connected to a receiving station by non-orthogonal multiple access, each of the plurality of transmitting stations being capable of transmitting a same signal successively to the receiving station by repetition for a predetermined number of times at a predetermined cycle which is common to the plurality of transmitting stations, the information processing apparatus comprising a controller configured to execute:

calculating an initial value of transmitting power to be assigned to each of the plurality of transmitting stations such that a transmitting station with a higher reception quality at the receiving station is assigned a higher initial transmitting power value than a transmitting station with a lower reception quality at the receiving station, and a difference in received power between signals received at the receiving stations from different transmitting stations is ensured;

identifying, among the plurality of transmitting stations, a first transmitting station to which a maximum initial transmitting power value is assigned; and calculating, based on a reception quality of signals received at the receiving station from the first transmitting station, a repetition count of transmissions from the first transmitting station.

11. The information processing apparatus according to claim 10, wherein the controller is further configured to execute:

eliminating the first transmitting station from the plurality of transmitting stations; and calculating, for each of the remaining transmitting stations, a repetition count and a transmitting power that is used after the elimination.

12. The information processing apparatus according to claim 11, wherein the controller is further configured to execute:

assigning, to each of the remaining transmitting stations, a transmitting power that is higher than a transmitting power which was assigned before the elimination.

13. The information processing apparatus according to claim 10, wherein a reception quality of each of the transmitting stations at the receiving station comprises a propagation loss between the receiving station and each of the plurality of transmitting stations.

14. The information processing apparatus according to claim 13, wherein the controller is further configured to execute:

calculating the propagation loss using a received signal strength at the receiving station in a case where each of the plurality of transmitting stations transmitted a signal to the receiving station at a predetermined transmitting power.

15. The information processing apparatus according to claim 13, wherein the controller is further configured to execute:

calculating the propagation loss using a received signal strength at each of the plurality of transmitting stations in a case where the receiving station transmitted a signal to each of the plurality of transmitting stations at a predetermined transmitting power.

16. The information processing apparatus according to claim 10, wherein the controller is further configured to execute:

eliminating the first transmitting station from the plurality of transmitting stations; and calculating, for each of the remaining transmitting stations, a transmitting power such that a difference in received power between signals originating from the remaining transmitting stations at the receiving station is in a range of power lower than the maximum initial transmitting power.

17. The information processing apparatus according to claim 10, wherein the controller is further configured to execute:

calculating reception quality of each of repeated transmissions at the receiving station; and determining the repetition count to be a minimum repetition count under which a reception quality acquired by the calculating satisfies a predetermined reception quality.

18. The information processing apparatus according to claim 10, wherein information is transmitted from the receiving station to each of the plurality of transmitting stations via a downlink control channel, the information including a repetition count assigned to each of the plurality of transmitting stations and a transmitting power to be used for each of repeated transmissions.

* * * * *